(12) United States Patent
Dukat

(10) Patent No.: US 9,757,733 B1
(45) Date of Patent: Sep. 12, 2017

(54) HERB GRINDING DEVICE

(71) Applicant: Dane Joseph Dukat, Scottsdale, AZ (US)

(72) Inventor: Dane Joseph Dukat, Scottsdale, AZ (US)

( * ) Notice: Subject to any disclaimer, the term of this patent is extended or adjusted under 35 U.S.C. 154(b) by 215 days.

(21) Appl. No.: 14/838,188

(22) Filed: Aug. 27, 2015

Related U.S. Application Data

(63) Continuation-in-part of application No. 14/681,808, filed on Apr. 8, 2015, and a continuation-in-part of application No. 29/511,175, filed on Dec. 8, 2014, now Pat. No. Des. 761,064, and a continuation-in-part of application No. 29/511,178, filed on Dec. 8, 2014, now Pat. No. Des. 755,584, and a continuation-in-part of application No. 29/511,180, filed on Dec. 8, 2014, now Pat. No. Des. 755,022, and a continuation-in-part of application No. 29/520,464, filed on Mar. 13, 2015, now Pat. No. Des. 759,438, which is a continuation-in-part of application No. 29/511,180, filed on Dec. 8, 2014, now Pat. No. Des. 755,022.

(60) Provisional application No. 62/042,746, filed on Aug. 27, 2014, provisional application No. 61/978,919, filed on Apr. 13, 2014.

(51) Int. Cl.
| | |
|---|---|
| *B02C 18/08* | (2006.01) |
| *A47J 42/24* | (2006.01) |
| *A47J 42/30* | (2006.01) |
| *B02C 18/18* | (2006.01) |
| *B02C 18/16* | (2006.01) |

(52) U.S. Cl.
CPC ............... *B02C 18/08* (2013.01); *A47J 42/24* (2013.01); *A47J 42/30* (2013.01); *B02C 18/18* (2013.01); *B02C 2018/162* (2013.01)

(58) Field of Classification Search
CPC ... B02C 18/08; B02C 18/18; B02C 2018/162; A47J 42/24; A47J 42/30
See application file for complete search history.

(56) References Cited

U.S. PATENT DOCUMENTS

| | | | |
|---|---|---|---|
| 4,280,666 | A | 7/1981 | Jones |
| 7,367,519 | B2 | 5/2008 | de Groote et al. |
| 7,422,170 | B2 | 9/2008 | Bao |
| 8,083,167 | B1 | 12/2011 | Namakian et al. |
| 8,393,563 | B2 | 3/2013 | Chaoui et al. |

(Continued)

*Primary Examiner* — Mark Rosenbaum
(74) *Attorney, Agent, or Firm* — Weiss & Moy, P.C.; Jeffrey D. Moy

(57) ABSTRACT

An herb grinding device having a first, second, third, and fourth section is disclosed. The first section includes a T-shaped slot on an outside surface, and a plurality of teeth extending from a top surface within a first cavity. The second section is removably coupled to the first section and includes a second section floor, a plurality of holes in the second section floor, a plurality of teeth extending from the second section floor within a second cavity. The third section is removably coupled to the second section opposite the first cylindrical section and includes a channel extending therethrough. The fourth section is removably coupled to the third section opposite the second cylindrical section and includes a collection cavity. Each of the first, second, third, and fourth cylindrical sections include a plurality of grips having alternating grip protrusions and grip recesses positioned axially along an outer perimeter of each section.

20 Claims, 38 Drawing Sheets

(56) References Cited

U.S. PATENT DOCUMENTS

| | | |
|---|---|---|
| D702,398 S | 4/2014 | Fakhouri et al. |
| 8,733,679 B2 | 5/2014 | Camitta |
| 2003/0015611 A1 | 1/2003 | Teng |
| 2007/0262182 A1 | 11/2007 | de Groote et al. |
| 2009/0212142 A1 | 8/2009 | Greiner |
| 2012/0168544 A1* | 7/2012 | Chaoui .................. B02C 18/08 241/68 |
| 2014/0217213 A1 | 8/2014 | Edwards et al. |
| 2014/0319249 A1* | 10/2014 | Smith ..................... A47J 43/25 241/24.1 |

* cited by examiner

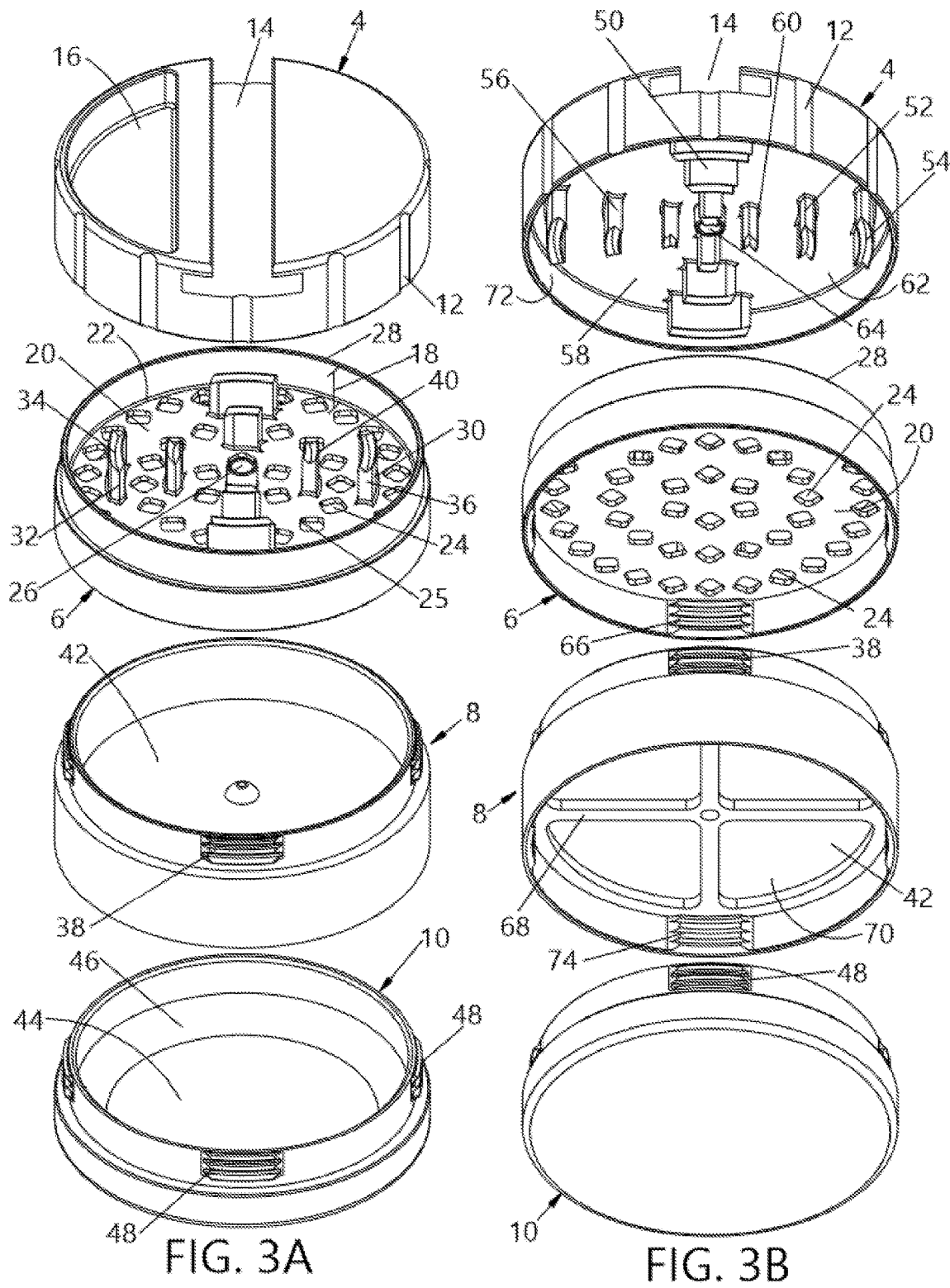

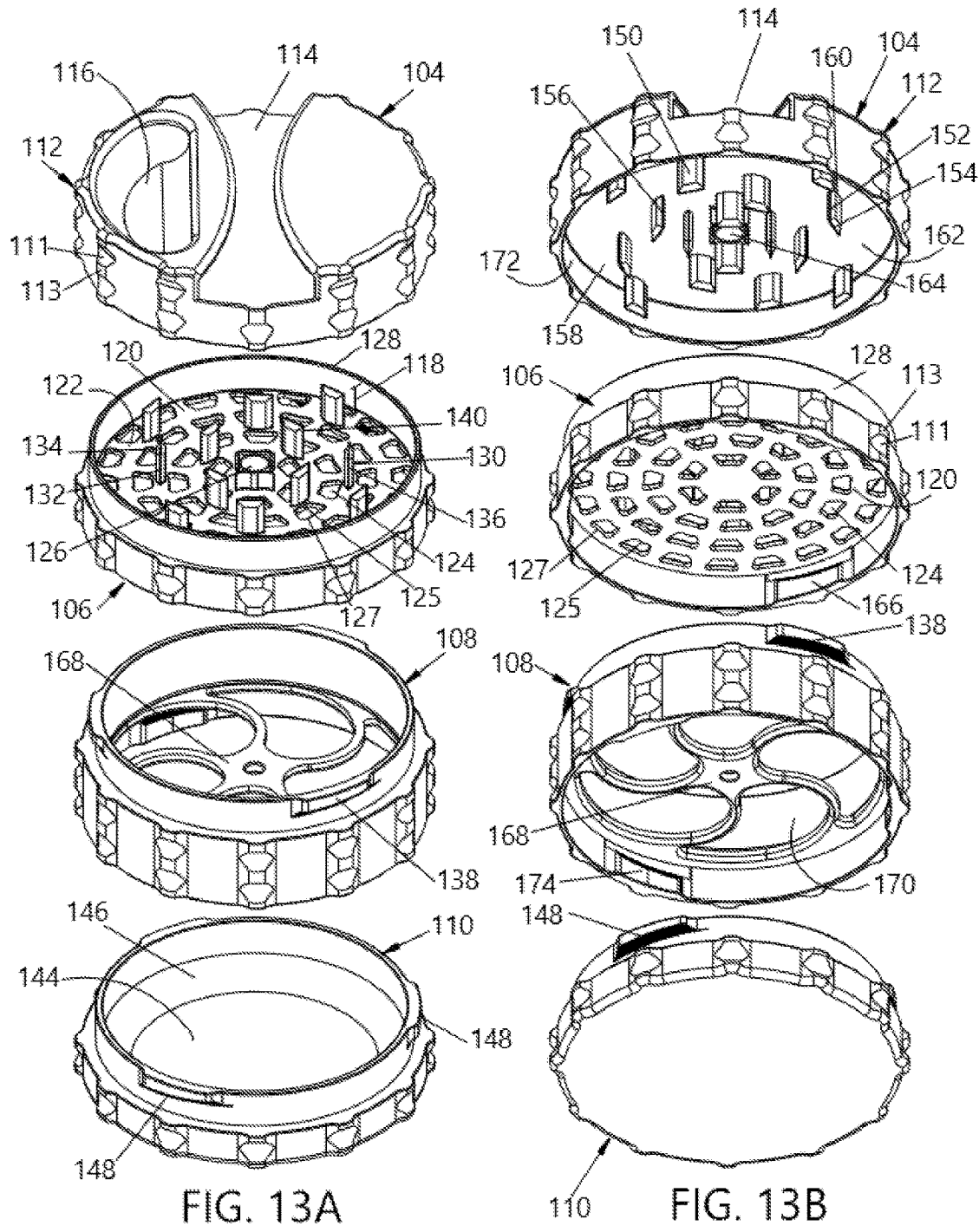

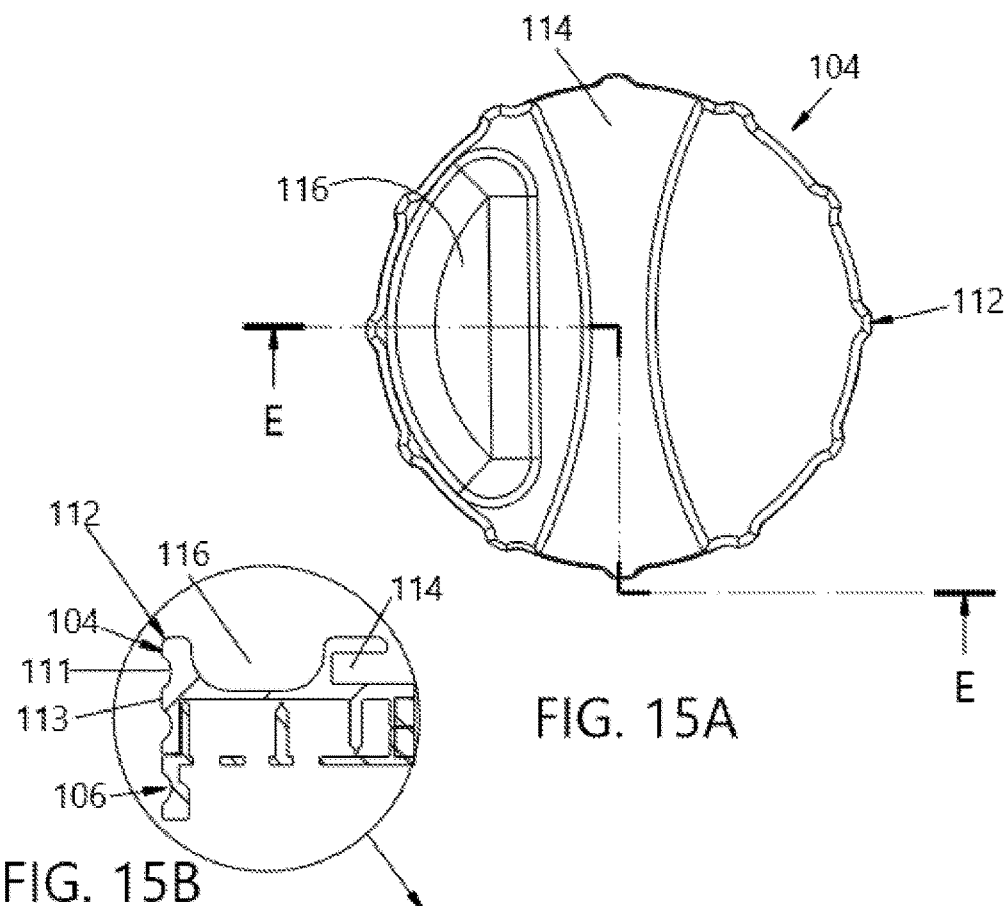
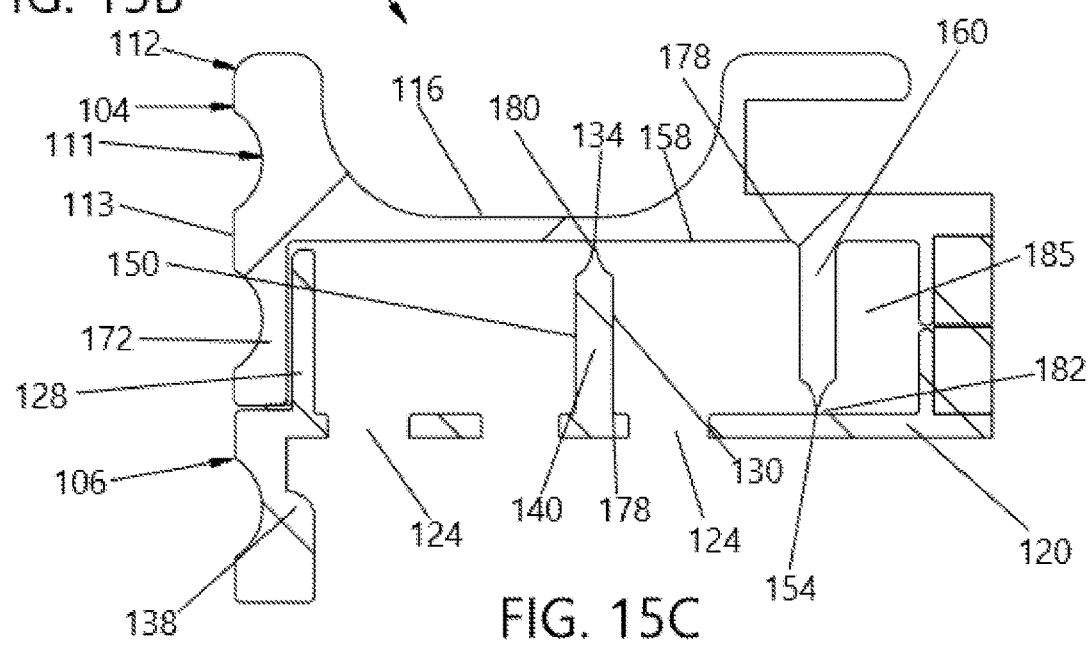

HERB GRINDING DEVICE

CROSS REFERENCE TO RELATED APPLICATIONS

This document claims the benefit of the filing date of U.S. Provisional Patent Application 62/042,746 entitled "Herb Grinding Device" to Dukat, which was filed on Aug. 27, 2014, the contents of which are hereby incorporated by reference.

This application is also: a continuation-in-part application of the earlier U.S. Utility patent application to Dukat entitled "Herb Grinding Device," application Ser. No. 14/681,808, filed Apr. 8, 2015 and now pending, which application claims the benefit of the filing date of U.S. Provisional Patent Application 61/978,919 entitled "Herb Grinding Device" to Dukat, which was filed on Apr. 13, 2014; a continuation-in-part application of the earlier U.S. Design patent application to Dukat entitled "Herb Grinding Device," application Ser. No. 29/511,175, filed Dec. 8, 2014 and now pending; a continuation-in-part application of the earlier U.S. Design patent application to Dukat entitled "Herb Grinding Device," application Ser. No. 29/511,178, filed Dec. 8, 2014 and now pending; a continuation-in-part application of the earlier U.S. Design patent application to Dukat entitled "Herb Grinding Device," application Ser. No. 29/511,180, filed Dec. 8, 2014 and now pending; and a continuation-in-part application of the earlier U.S. Design patent application to Dukat entitled "Herb Grinding Device," application Ser. No. 29/520,464, filed Mar. 13, 2015 and now pending, which application is a continuation-in-part application of U.S. Design patent application Ser. No. 29/511,180, entitled "Herb Grinding Device" to Dukat, filed Dec. 8, 2014 and now pending, the contents of which are all hereby incorporated herein by reference.

BACKGROUND

1. Technical Field

Aspects of this document relate generally to herb grinding devices.

2. Background Art

Grinders are commonly used for rendering foods and spices to mulch or particulate form. Conventional food grinders are typically a large home or industrial scale device suitable for shearing/grinding large volumes of food or herbs. Such food grinders may typically be driven by a motor that cause an excessive amount of heat energy to be transferred to the herb, thus increasing the risk of heating and spoiling the herb. Furthermore, certain herbs are required in only small quantities at a time for specific consumption.

SUMMARY

According to one aspect, an herb grinding device comprises a first cylindrical section, a second cylindrical section, and at least a third cylindrical section. The first cylindrical section comprises a first cavity, a top surface, and a plurality of teeth extending from the top surface within the first cavity in at least two concentric teeth rings, each of the plurality of teeth comprising a V-shaped protrusion on a bottom end opposite the top surface and each of the at least two concentric teeth rings comprising at least two teeth. The second cylindrical section is rotatably coupled to the first cylindrical section and comprises a second cavity facing the first cavity, a second cylindrical section floor, a plurality of holes in the second cylindrical section floor, and a plurality of teeth extending from the second cylindrical section floor within the second cavity in at least two concentric teeth rings each comprising at least two teeth, each of the plurality of teeth comprising a V-shaped protrusion on a top end of the circular arced tooth opposite the second cylindrical section floor. The at least two concentric teeth rings of the second cylindrical section are positioned between the at least two concentric teeth rings of the first cylindrical section and the plurality of teeth of the second cylindrical section at least partially overlap the plurality of teeth of the first cylindrical section. The at least a third cylindrical section is removably coupled to the second cylindrical section and comprises a collection cavity.

Various implementations and embodiments may comprise one or more of the following. The second cylindrical section may comprise an annular flange positioned within the first cavity and interfacing an outer wall of the first cylindrical section. The at least third cylindrical section may comprise: a third cylindrical section removably coupled to the second cylindrical section opposite the first cylindrical section, the third cylindrical section comprising a channel extending through the third cylindrical section and one or more support arms extending across the channel; and, a fourth cylindrical section removably coupled to the third cylindrical section opposite the second cylindrical section, the fourth cylindrical section comprising the collection cavity. The plurality of holes in the second cylindrical section floor may be arranged in at least two concentric hole rings each comprising a plurality of holes, each of the at least two concentric hole rings being aligned with each of the at least two concentric teeth rings of the first cylindrical section. A gap of approximately 0.010" inches between the bottom end of each of the plurality of teeth of the first cylindrical section and the second cylindrical section floor and a gap of approximately 0.010" inches between the top end of each of the plurality of teeth of the second cylindrical section and the top surface. The plurality of holes may be substantially isosceles trapezoidal in shape with rounded corners, each of the plurality of holes being positioned such that a shortest side of the hole is proximate a center of the second cylindrical section floor and a longest side of the hole is distal the center of the second cylindrical section floor. Each of the plurality of teeth of the first cylindrical section and the second cylindrical section may be substantially planar, equal in dimension, and comprise a V-shaped protrusion on a first end of the tooth and a V-shaped protrusion on a second end of the tooth. The first section may comprise at least three concentric teeth rings each comprising at least four teeth of the plurality of teeth of the first section offset from at least four teeth of an adjacent concentric teeth ring of the plurality of concentric teeth rings of the first section. The second cylindrical section may comprise at least three concentric teeth rings each comprising at least four teeth of the plurality of teeth of the second cylindrical section offset from a plurality of teeth of an adjacent concentric teeth ring of the plurality of concentric teeth rings of the second cylindrical section. The first cylindrical section may be coupled to the second cylindrical section with a first magnet positioned at a center of the top surface and a second magnet positioned at a center of the second cylindrical section floor and in contact with the first magnet at a center point between the top surface and the second cylindrical section floor, and the herb grinding device may comprise a radiused edge within the collection cavity and a screen coupled to the one or more support arms and positioned within the channel. The first cylindrical section may comprise a recessed outer cavity, a T-shaped slot, and one or more bumper rings removably coupled the first section. The fourth cylindrical section may comprise a male lock notch positioned on an annular flange, the third cylindrical section may comprise a female lock notch positioned within the third cylindrical section and configured to engage the male lock notch of the fourth cylindrical section, the third cylindrical section may comprise a male lock notch positioned on an annular flange, and the second cylindrical section may comprise a female lock notch positioned within the second cylindrical section and configured to engaged the male lock notch of the third cylindrical section. Each of the first, second, third, and fourth cylindrical sections may each comprise a plurality of grips, each grip of the plurality of grips comprising alternating grip protrusions and grip recesses positioned axially along an outer perimeter of the respective section. The plurality of grips of the second, third, and fourth cylindrical sections align with one another when the male lock notch of the third cylindrical section is engaged with the female lock notch of the second cylindrical section and the male lock notch of the fourth cylindrical section is engaged with the female lock notch of the third cylindrical section. The one or more bumper rings may be positioned within the grip recesses of the plurality of grips of the first cylindrical section.

According to another aspect, an herb grinding device comprises a first cylindrical section, a second cylindrical section, a third cylindrical section, and a fourth cylindrical section. The first cylindrical section comprises a first cavity, a top surface, a plurality of teeth extending from the top surface within the first cavity. The second cylindrical section is rotatably and removably coupled to the first cylindrical section and comprises a second cavity facing the first cavity, a second cylindrical section floor, a plurality of holes in the second cylindrical section floor, a plurality of teeth extending from the second cylindrical section floor within the second cavity, and an annular flange positioned within the first cavity and interfacing an outer wall of the first cylindrical section. The third cylindrical section is removably coupled to the second cylindrical section opposite the first cylindrical section, the third cylindrical section comprising a channel extending through the third cylindrical section and one or more support arms extending across the channel. The fourth cylindrical section is removably coupled to the third cylindrical section opposite the second cylindrical section and comprises the collection cavity. Each of the first, second, third, and fourth cylindrical sections comprise a plurality of grips, each grip of the plurality of grips comprising alternating grip protrusions and grip recesses positioned axially along an outer perimeter of the respective section. The plurality of grips of the second, third, and fourth cylindrical sections align with one another when the third cylindrical section is coupled to the second cylindrical section and the fourth cylindrical section is coupled to the third cylindrical section.

Various implementations and embodiments may comprise one or more of the following. A T-shaped slot on an outside surface of the first cylindrical section and one or more bumper rings removably coupled to the first cylindrical section, the one or more bumper rings being positioned within the grip recesses of the plurality of grips of the first cylindrical section. The plurality of teeth of the first cylindrical section may be positioned in at least two concentric teeth rings, each of the plurality of teeth of the first cylindrical section comprising a V-shaped protrusion on a bottom end opposite the top surface and each of the at least two concentric teeth rings comprising at least two teeth. The plurality of teeth of the second cylindrical section are positioned in at least two concentric teeth rings, each of the plurality of teeth of the second cylindrical section comprising a V-shaped protrusion on a bottom end opposite the top surface and each of the at least two concentric teeth rings comprising at least two teeth. The plurality of holes in the second cylindrical section floor may be arranged in at least two concentric hole rings each comprising a plurality of holes, each of the at least two concentric hole rings being aligned with each of the at least two concentric teeth rings of the first cylindrical section. A gap of approximately 0.010" inches between the bottom end of each of the plurality of teeth of the first cylindrical section and the second cylindrical section floor and a gap of approximately 0.010" inches between the top end of each of the plurality of teeth of the second cylindrical section and the top surface. The plurality of holes may be substantially isosceles trapezoidal in shape with rounded corners, each of the plurality of holes being positioned such that a shortest side of the hole is proximate a center of the second cylindrical section floor and a longest side of the hole is distal the center of the second cylindrical section floor. Each of the plurality of teeth of the first cylindrical section and the second cylindrical section may be substantially planar, equal in dimension and comprise a V-shaped protrusion on a first end of the tooth and a V-shaped protrusion on a second end of the tooth. The first cylindrical section may comprise at least three concentric teeth rings each comprising at least four teeth of the plurality of teeth of the first cylindrical section offset from at least four teeth of an adjacent concentric teeth ring of the plurality of concentric teeth rings of the first cylindrical section. The second cylindrical section comprises at least three concentric teeth rings each comprising at least four teeth of the plurality of teeth of the second cylindrical section offset from a plurality of teeth of an adjacent concentric teeth ring of the plurality of concentric teeth rings of the second cylindrical section. The first cylindrical section may be coupled to the second cylindrical section with a first magnet positioned at a center of the top surface and a second magnet positioned at a center of the second cylindrical section floor and in contact with the first magnet at a center point between the top surface and the second cylindrical section floor. The herb grinding device may comprise a radiused edge within the collection cavity and a screen coupled to the one or more support arms and positioned within the channel.

According to another aspect, an herb grinding device comprises a first cylindrical section, a second cylindrical section, and at least a third cylindrical section. The first cylindrical section comprises a first cavity, a top surface, and a plurality of teeth extending from the top surface within the first cavity, and a T-shaped slot on an outside surface of the first cylindrical section opposite the first cavity, the T-shaped slot sized to receive a rolling papers sleeve package within the T-slot. The second cylindrical section is rotatably coupled to the first cylindrical section and comprises a second cavity facing the first cavity, a second cylindrical section floor, a plurality of holes in the second cylindrical section floor, and a plurality of teeth extending from the second cylindrical section floor within the second cavity. The at least third cylindrical section is removably coupled to the second cylindrical section and comprises a collection cavity.

Various implementations and embodiments may comprise one or more of the following. The second cylindrical section may comprise an annular flange positioned within the first cavity and interfacing an outer wall of the first cylindrical section. The at least third cylindrical section may comprise:

a third cylindrical section removably coupled to the second cylindrical section opposite the first cylindrical section, the third cylindrical section comprising a channel extending through the third cylindrical section and one or more support arms extending across the channel; and, a fourth cylindrical section removably coupled to the third cylindrical section opposite the second cylindrical section, the fourth cylindrical section comprising the collection cavity. Each of the first, second, third, and fourth cylindrical sections may comprise a plurality of grips, each grip of the plurality of grips comprising alternating grip protrusions and grip recesses positioned axially along an outer perimeter of the respective section. The plurality of grips of the second, third, and fourth cylindrical sections align with one another when the third cylindrical section is coupled to the second cylindrical section and the fourth cylindrical section is coupled to the third cylindrical section. The plurality of teeth of the first cylindrical section may be positioned in at least two concentric teeth rings, each of the plurality of teeth of the first cylindrical section comprising a V-shaped protrusion on a bottom end opposite the top surface and each of the at least two concentric teeth rings comprising at least two teeth. The plurality of teeth of the second cylindrical section may be positioned in at least two concentric teeth rings, each of the plurality of teeth of the second cylindrical section comprising a V-shaped protrusion on a bottom end opposite the top surface and each of the at least two concentric teeth rings comprising at least two teeth. The plurality of holes in the second cylindrical section floor may be arranged in at least two concentric hole rings each comprising a plurality of holes, each of the at least two concentric hole rings being aligned with each of the at least two concentric teeth rings of the first cylindrical section. The plurality of holes may be substantially isosceles trapezoidal in shape with rounded corners, each of the plurality of holes being positioned such that a shortest side of the hole is proximate a center of the second cylindrical section floor and a longest side of the hole is distal the center of the second cylindrical section floor. Each of the plurality of teeth of the first cylindrical section and the second cylindrical section are substantially planar, equal in dimension and comprise a V-shaped protrusion on a first end of the tooth and a V-shaped protrusion on a second end of the tooth.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 3A is an upper exploded view of an herb grinding device;

FIG. 3B is a lower exploded view of an herb grinding device;

FIG. 13A is an upper exploded view of a second embodiment of an herb grinding device;

FIG. 13B is a lower exploded view of a second embodiment of an herb grinding device;

FIG. 15A is a top view of a first and second section of a second embodiment of an herb grinding device FIG. 15B is a cross sectional view of a first and second section of a second embodiment of a second embodiment of an herb grinding device taken along sectional line E-E of FIG. 15A;

FIG. 15C is an enlarged cross sectional view of the circled portion of FIG. 15B;

DESCRIPTION

This disclosure, its aspects and implementations, are not limited to the specific components or assembly procedures disclosed herein. Many additional components and assembly procedures known in the art consistent with the intended herb grinding device and/or assembly procedures for an herb grinding device will become apparent for use with implementations of herb grinding devices from this disclosure. Accordingly, for example, although particular herb grinding devices are disclosed, such herb grinding devices and implementing components may comprise any shape, size, style, type, model, version, measurement, concentration, material, quantity, and/or the like as is known in the art for such herb grinding device and implementing components, consistent with the intended operation of an herb grinding device.

Contemplated as part of this disclosure are various embodiments of an herb grinding device that incorporate innovations, improvements and enhancements that impact the quality and process of shearing/grinding herbs, plants, botanicals and other materials into usable and preferred consistencies for various uses. As shall be described in greater detail through this disclosure, embodiments of this device may be handheld, non-electric, and/or intended to grind small quantities of material. According to some aspects, an herb grinding device of this disclosure may have multiple cylindrical sections, wherein rotation of two of the sections produces a shearing and/or grinding action as teeth pass in between one another. The floor of the second section may include a series of holes that allow the ground herbs to be separated and be stored in the third section below the second section. The third section may include a screen that filters finely ground herbs, and a fourth section separates and stores the finely ground herbs. Greater details and other configurations of each of these sections will be described below.

As shall also be described throughout this disclosure, one or more of the herb grinding devices contemplated herein are advantageous to conventional herb grinding devices by providing three different coarseness options of ground herbs due to a dual teeth edge design, reducing the force/friction required to grind herbs due to the design of radial cut teeth, increasing longevity of the device due to innovative design of the threading notches that eliminates cross threading, increasing longevity of the device due to the replaceable fine filtering screen and support for the screen by a cross brace support member, and providing a portable solution for users to manually grind small quantities of herbs while addressing all the common pit falls associated with traditional grinders.

Figure 1:
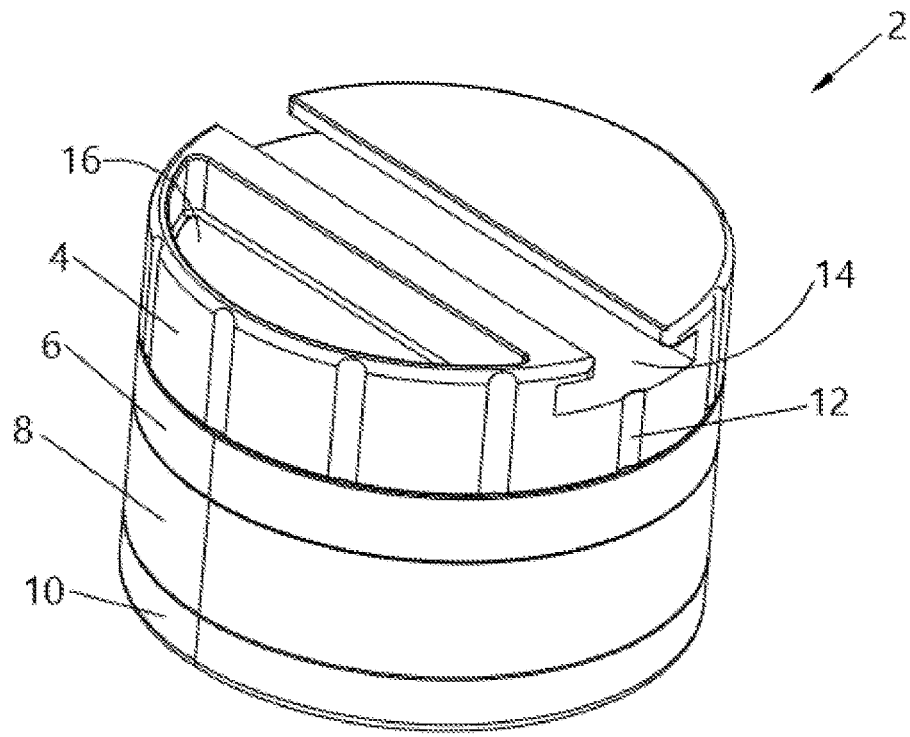
FIG. 1 is a perspective view of an herb grinding device.
Figure 4A:
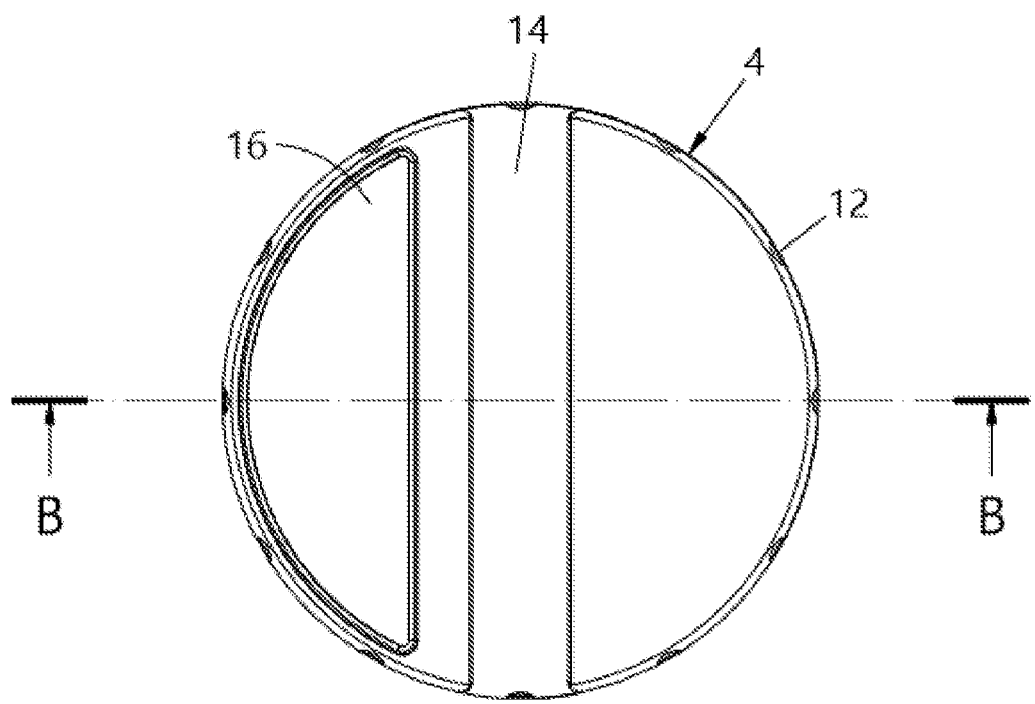
FIG. 4A is a top view of an herb grinding device.
Figure 4B:
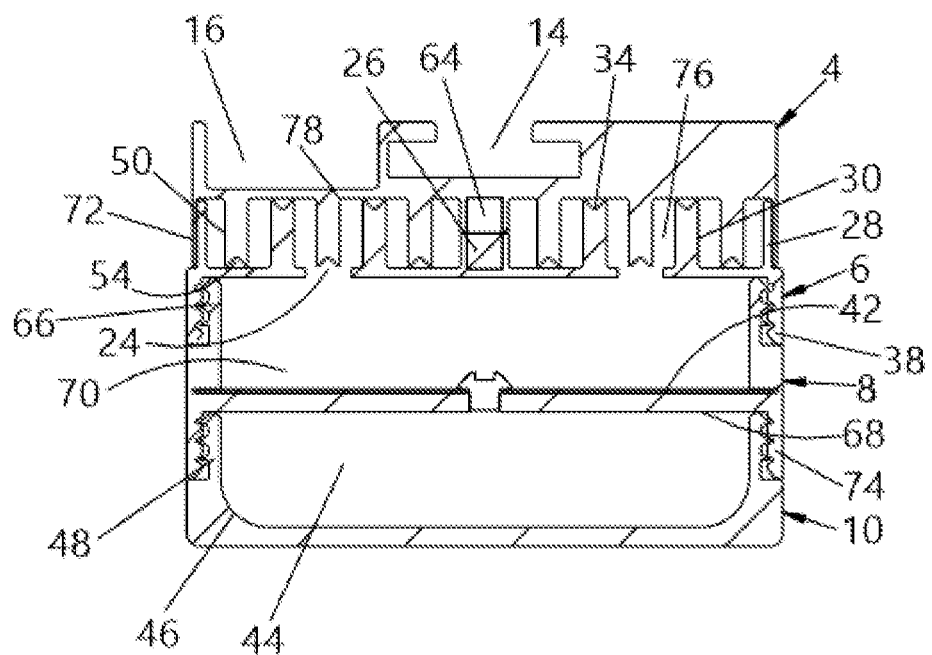
FIG. 4B is a cross-sectional view of an herb grinding device taken along sectional line B-B in FIG. 4A.

Contemplated as part of this disclosure are various embodiments of an herb grinding device 2. In one or more embodiments, an herb grinding device 2 is relatively lightweight and portable, and yet very strong. By way of example and not limitation, an herb grinding device 2 may be manufactured from 6061 or 7075 grade aluminum, 304 stainless, or T2 titanium. According to some aspects, an herb grinding device 2 comprises at least a first section 4 and a second section 6. Other contemplated embodiments may comprise a third section 8 and/or a fourth section 10, although these sections are not required in all embodiments. Although reference is made in this description and in the figures to substantially cylindrical sections of an herb grinding device 2, it is contemplated that the exterior of the herb grinding device 2 is not always cylindrical and may, instead, comprise any other geometric shapes and configurations. FIG. 1 provides a perspective view of a non-limiting embodiment of a herb grinding device 2 comprising a first section 4 coupled to a second section 6, a third section 8 coupled to the second section 6 opposite the first section 4, and a fourth section 10 coupled to the third section 8 opposite the second section 6. FIGS. 3A and 3B provide exploded top and bottom perspective views, respectively, and FIG. 4B provides a cross sectional view of non-limiting embodiment of an herb grinding device 2 comprising a first section 4, a second section 6, a third section 8, and a fourth section 10. Details of each of the sections shall be provided below.

In one or more embodiments, an herb grinding device 2 comprises a first section 4 rotatably and removably coupled to a second section 6. FIGS. 7A-7F depict various views of a non-limiting embodiment of a first section 4. According to some aspects, a first section 4 comprises a substantially cylindrical first section 4 having a cylindrical first cavity 62 within a portion of the cylindrical first section 4. In other embodiments, a first section may comprise other geometric configurations on the outside of the first section, and maintain a cylindrical first cavity 62 within a portion of the first section. The first cavity 62 may be bordered by circular outer wall 72 and a top surface 58, and comprise an opening opposite the top surface 58. According to some aspects, the first cavity 62 comprises a depth of between approximately 0.25" and 0.75". The outer wall 72 is sized to receive a portion of the second section 6 within the first cavity 62 or, alternatively, fit within a portion of the second section 6.

In one or more embodiments, a first section 4 comprises a plurality of teeth 50. According to some aspects, the plurality of teeth 50 extend from the top surface 58 of the first section and are positioned to form a plurality of concentric teeth rings 60, with each concentric teeth ring 60 comprising a plurality of teeth 50. In the non-limiting embodiment depicted in FIGS. 7A-7F, the first section 4 comprises three concentric teeth rings 60, with each concentric teeth ring 60 comprising four equally spaced apart teeth 50. In other embodiments, a first section 4 may comprise any number of concentric teeth rings 60 and any number of teeth 50 within each concentric teeth ring. Each concentric teeth ring 60 comprises a center aligned with a center of the first cavity 62. In the non-limiting embodiment depicted in FIG. 7B, for example, a magnet 64 is positioned at a center of the first cavity 62 of the first section 4. According to some aspects, the plurality of teeth 50 within each concentric teeth ring 60 may be aligned with the plurality of teeth 50 within each adjacent teeth ring 60. For example, in the non-limiting embodiment depicted in FIG. 7B, the four teeth 50 in each concentric ring are aligned with the four teeth in the adjacent concentric teeth ring 60, each tooth 50 within each concentric teeth ring 60 being approximately 90 degrees from the adjacent teeth of the same concentric teeth ring 60. That is, the teeth 50 of adjacent teeth rings 60 are aligned, but narrow in radial length towards a center of the first cavity 62 in a pie-shaped configuration. Thus, a pie-shaped configuration of space may exist between aligned teeth 50.

Figure 7A:
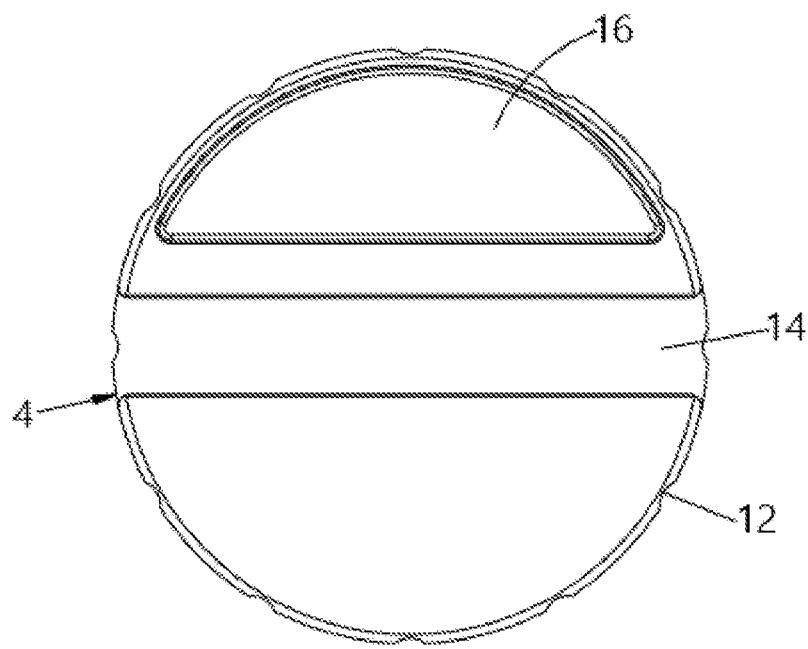
FIG. 7A is a top view of a first section of an herb grinding device.
Figure 7B:
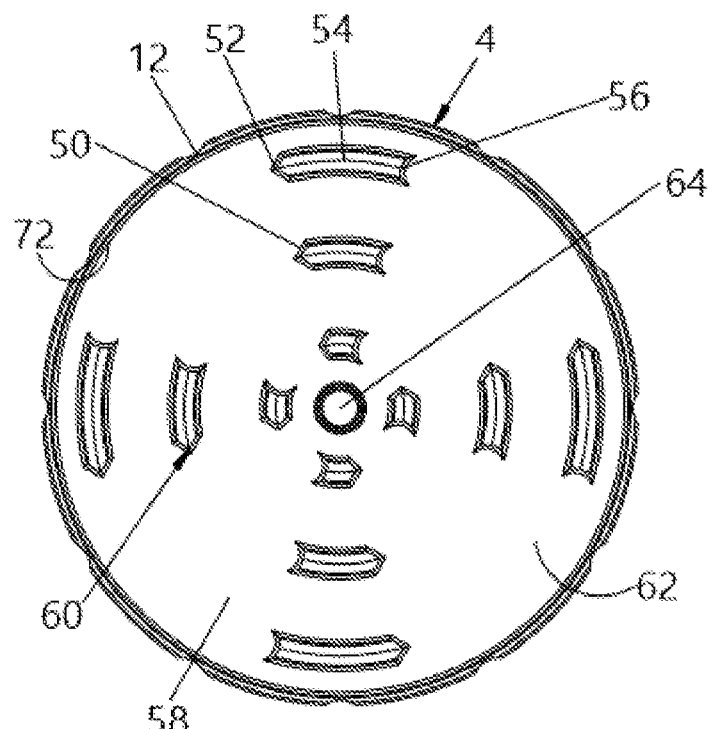
FIG. 7B is a bottom view of a first section of an herb grinding device.
Figure 7C:
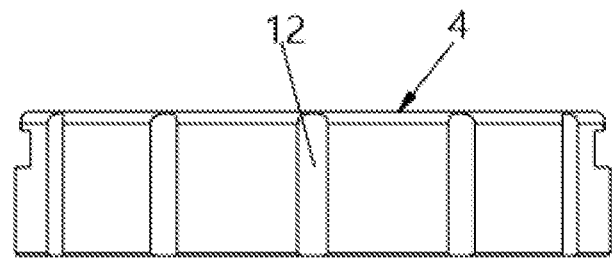
FIG. 7C is a first side view of a first section of an herb grinding device.
Figure 7D:
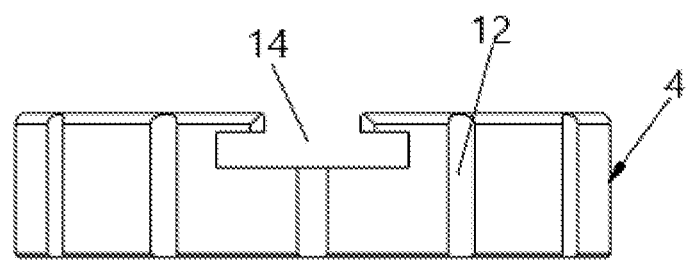
FIG. 7D is a second side view of a first section of an herb grinding device.
Figure 7E:
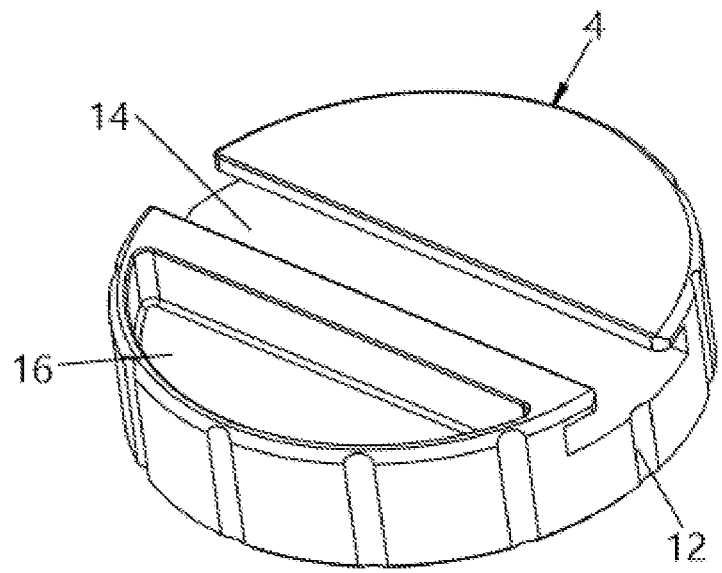
FIG. 7E is top perspective view of a first section of an herb grinding device.
Figure 7F:
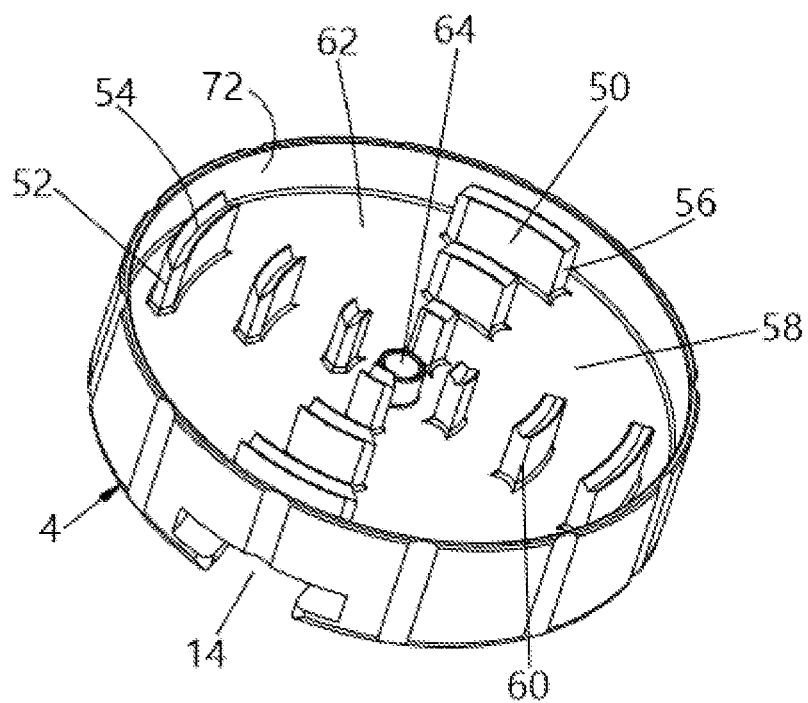
FIG. 7F is a bottom perspective view of a first section of an herb grinding device.
Figure 7G:
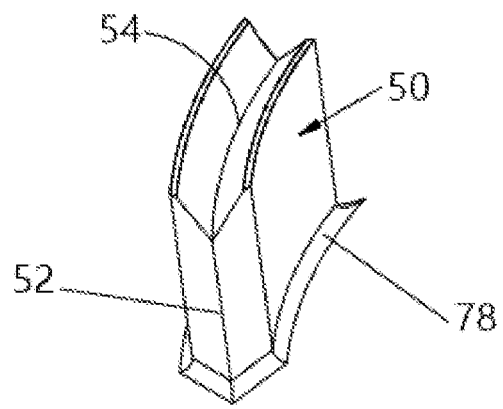
FIG. 7G is a front perspective view of a tooth of a first section of an herb grinding device.
Figure 7H:
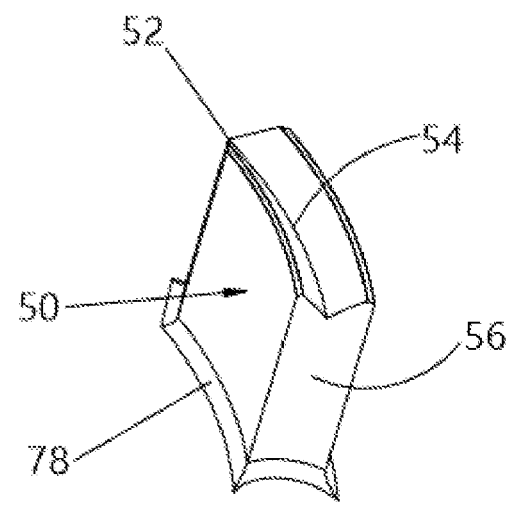
FIG. 7H is a rear perspective view of a tooth of a first section of an herb grinding device.

In one or more embodiments, each tooth 50 of the first section 4 comprises a circular arced tooth 50. More particularly, each circular arced tooth 50 may comprise a center point of the arc at a center of first cavity 62. Circular arced teeth 50 are advantageous to conventional teeth because circular arced teeth are extremely strong and unbreakable due to the curvature and elongation of the teeth 50. Conventional teeth are typically post teeth, which are prone to breaking when enough force is applied. Circular arced teeth are also more elongated teeth 50 than conventional post teeth, and allow the ground material to essentially roll between the teeth 50 and become compacted, which then allows the material to fall through the holes 24 with less effort. FIGS. 7G and 7H depict close up views of non-limiting embodiments of a circular arc tooth 50 of the first section 4. According to some aspects, each tooth 50 may comprise one or more of the following: a V-shaped protrusion 52 on a first end of the tooth 50, a crescent shaped recess 56 on a second end of the tooth 50 opposite the first end, and a V-shaped recess 54 on a bottom end of the tooth 50 opposite the top surface 58. The V-shaped recess 54 may comprise an angle of between approximately 30 degrees and 150 degrees. A V-shaped recess 54 on a bottom end of the tooth 50 assists in the shearing and/or grinding by allowing the first section 4 to be placed on to the second section 6 without the need to smash it in place. This helps slice down through the unground material rather than just smashing the sections together with brute force. The V-shaped recess 54 on a bottom end of the tooth 50 also reduces the amount of ground material sticking to the interior of the first cavity 62 and the second cavity 22 by reducing surface area contact.

In the non-limiting embodiment depicted in FIGS. 7G and 7H, each tooth comprises a V-shaped protrusion 52 on a first end of the tooth 50, a crescent shaped recess 56 on a second end of the tooth 50 opposite the first end, and a V-shaped recess 54 on a bottom end of the tooth 50 opposite the top surface 58. According to some aspects, each tooth 50 in each concentric teeth ring 60 extends approximately 30 degrees along the respective teeth ring 60. In some embodiments, a width of each tooth of the plurality of teeth 50 may be between approximately 0.050" and 0.150". The V-shaped portion of each recess or protrusion may be sharp and angular or, alternatively, partially rounded. In one or more embodiments, each tooth 50 may comprise a radiused edged 78 at a base of the tooth 50 where the tooth 50 intersects the top surface 58, thus providing additional strength to the tooth 50.

In one or more embodiments, rotatable coupling of a first section 4 to a second section 6 is enhanced or strengthened by a magnet 64 at the center of the first cavity 62, such as but not limited to a neodymium magnet. The magnet 64 may be magnetically attracted to metal of the second section 6 or, alternatively a magnet 26 positioned at a center of the second section 6. Magnetic coupling of the first section 4 and the second section 6 is advantageous because it prevents the sections from separating during rotation of the first section and grinding, while still allowing for easy and quickly removal of the first section 4 from the second section 6 to insert herbs into the grinding device 2. More particularly, each magnet 64, 26 may be held in place on the respective first section 4 or second section by a magnet boss on each section. In some embodiments, a magnet boss of the second section 6 is equal distance from the second section floor 20 as a magnet boss of the first section 4 is from the top surface 58. This allows the magnets 64, 26 to meet and contact each other a center point between the top surface 58 and the second section floor 20. Such a configuration inhibits material from getting stuck between the magnets and weakening the magnetic coupling between the magnets 64, 26. In other embodiments, any other coupling devices known in the art may be utilized.

In one or more embodiments, a first section 4 may comprise at least one of a recessed outer cavity 16, a T-shaped slot 14, and a plurality of gripping slots 12. The recessed outer cavity 16 is positioned on an outside of the first section 4 opposite the first cavity 62 and may be sized to function as an ash tray on the herb grinding device 2. According to some aspects, the recessed outer cavity comprises a width approximately one-third a diameter of the first section 4. Although the embodiment depicted in FIG. 7A comprises only a single recessed outer cavity 16, it is contemplated that some embodiments may comprise two recessed outer cavities 16, with a T-shaped slot being positioned between the two recessed outer cavities 16. A t-shaped slot 14 may be sized to allow for a standard rolling papers sleeve package to be held in place within the T-slot. This allows rolling papers to be dispensed through the top surface of the first section 4. This helps prevent loss or misplacement of the rolling papers by the user. One or more embodiments of a first section 4 further comprise gripping elements, such as but not limited to a plurality of gripping slots 12 on an outer circumference of the first section 4. The gripping slots 12 allow for a more natural grip of the hand and fingers. Thus, a user need apply significantly less pressure when rotating the lid as compared to the conventional knurl style grip.

As previously noted an herb grinding device 2 of this disclosure may further comprise a second section 6 rotatably coupled to a first section 4. FIGS. 8A-8E depict a non-limiting embodiment of a second section 6. According to some aspects, a second section 6 comprises a substantially cylindrical second section 6 having a cylindrical second cavity 22 within a portion of the cylindrical second section 6. In other embodiments, a second section may comprise other geometric configurations on the outside of the second section, and maintain a cylindrical second cavity 22 within a portion of the second section. The second cavity 22 may be bordered by annular flange 28 and a second section floor 20, and comprise an opening opposite the second section floor 20. According to some aspects, a second cavity 22 comprises a depth between approximately 0.25" and 0.75". The annular flange 28 according to some aspects is sized to fit within the first cavity 62 and interface with or be adjacent to the outer wall 72 of the first section 72. This configuration allows the first section 4 to rotate freely about the annular flange 28 in either direction. This configuration also reduces residue buildup and accumulation because the annular flange 28 fits within the first section 4. Accordingly, a slight space may exist between the interfaced outer wall 72 and annular flange 28 to allow rotation of the first section 4 relative to the second section 6. In other embodiments, the annular flange 28 is sized to receive a portion of the first section 4 to allow rotation of the first section 4 within the second cavity 22.

In one or more embodiments, a second section 6 comprises a plurality of teeth 30. According to some aspects, the plurality of teeth 30 extend from second section floor 20 within the second cavity 22 of the second section 6 and are positioned to form a plurality of concentric teeth rings 40, with each concentric teeth ring 40 comprising a plurality of teeth 30. In the non-limiting embodiment depicted in FIGS. 8A-8E, the second section 6 comprises two concentric teeth rings 40, with each concentric teeth ring 40 comprising four equally spaced apart teeth 30. In other embodiments, a second section 6 may comprise any number of concentric teeth rings 40 and any number of teeth 30 within each concentric teeth ring 40. Each concentric teeth ring 40 comprises a center aligned with a center of the second cavity 22. In the non-limiting embodiment depicted in FIG. 8A, for example, a magnet 26 is positioned at a center of the second cavity 22 of the second section 6. According to some aspects, the plurality of teeth 30 within each concentric teeth ring 40 may be aligned with the plurality of teeth 30 within each adjacent teeth ring 40. For example, in the non-limiting embodiment depicted in FIG. 8A, the four teeth 30 in each concentric ring 40 are aligned with the four teeth 30 in the adjacent concentric teeth ring 40, each tooth 30 within each concentric teeth ring 40 being approximately 90 degrees from the adjacent teeth of the same concentric teeth ring 40. That is, the teeth 30 of adjacent teeth rings 40 are aligned, but narrow in radial length towards a center of the second cavity 22 in a pie-shaped configuration. Thus, a pie-shaped configuration of space may exist between aligned teeth 30.

Figure 8A:
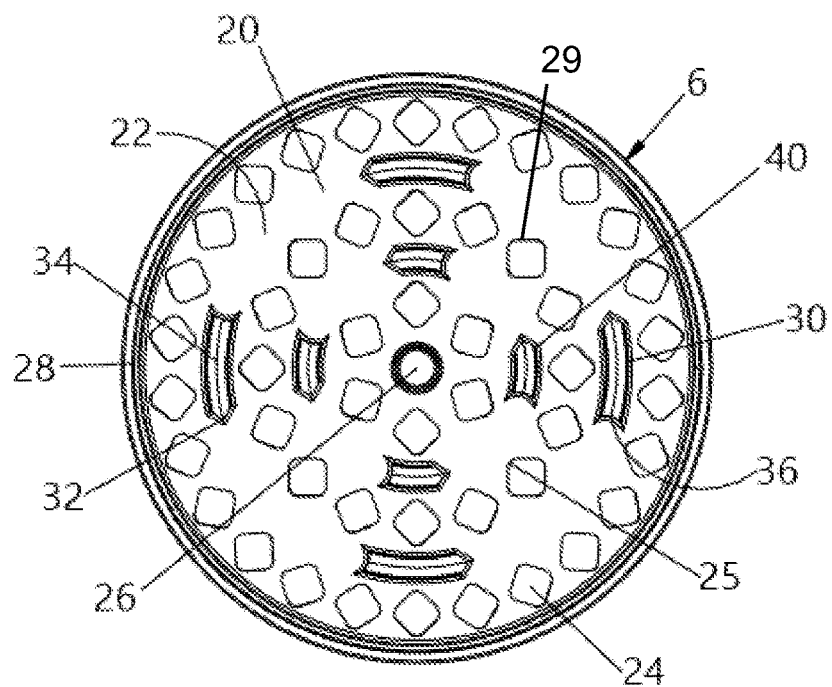
FIG. 8A is a top view of a second section of an herb grinding device.
Figure 8B:
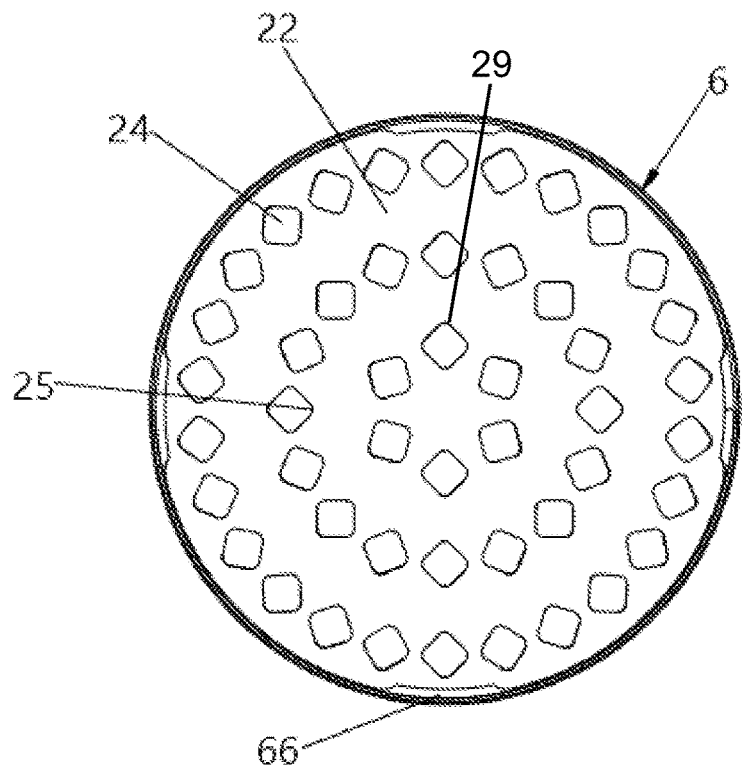
FIG. 8B is a bottom view of a second section of an herb grinding device.
Figure 8C:
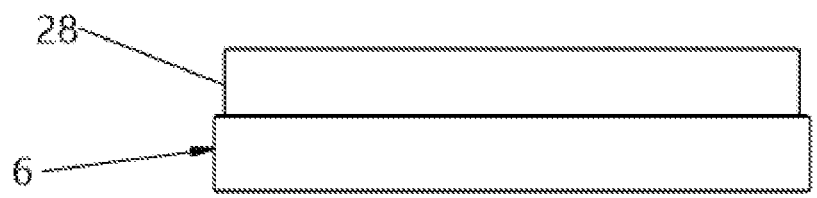
FIG. 8C is a side view of a second section of an herb grinding device.
Figure 8D:
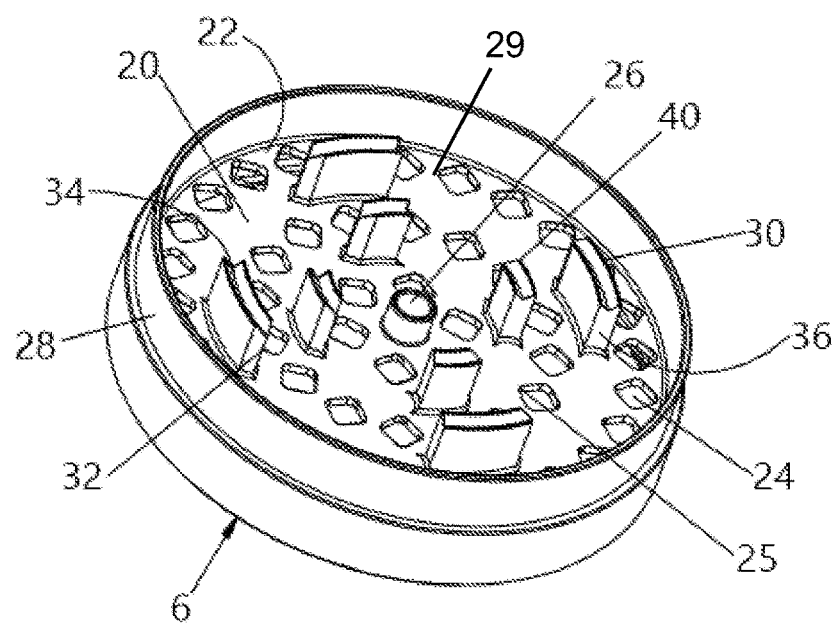
FIG. 8D is a top perspective view of a second section of an herb grinding device.
Figure 8E:
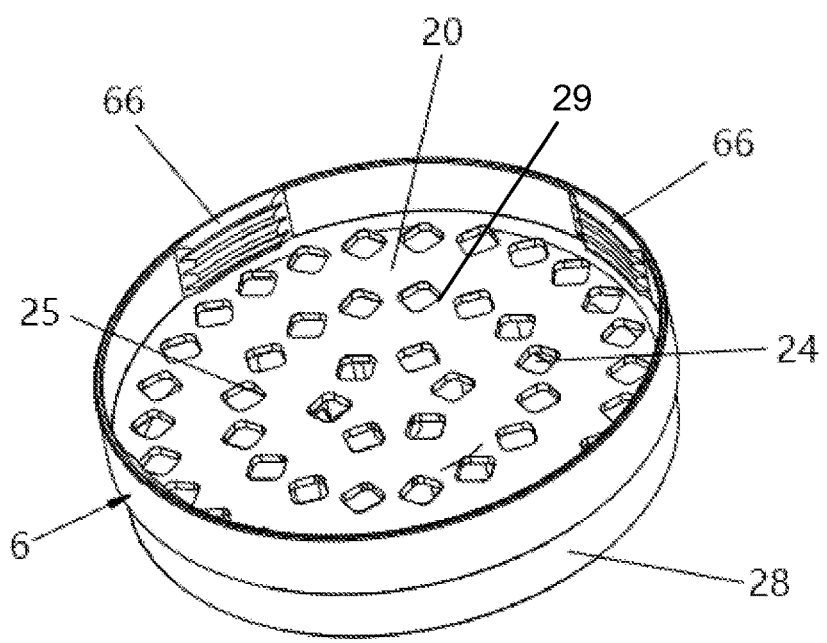
FIG. 8E is a bottom perspective view of a second section of an herb grinding device.
Figure 8F:
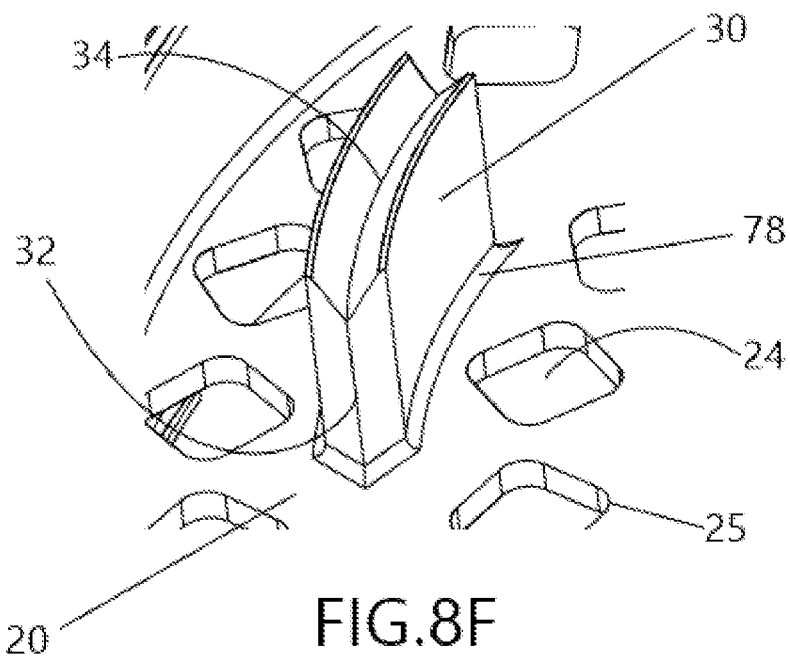
FIG. 8F is a front perspective view of a tooth of a second section of an herb grinding device.
Figure 8G:
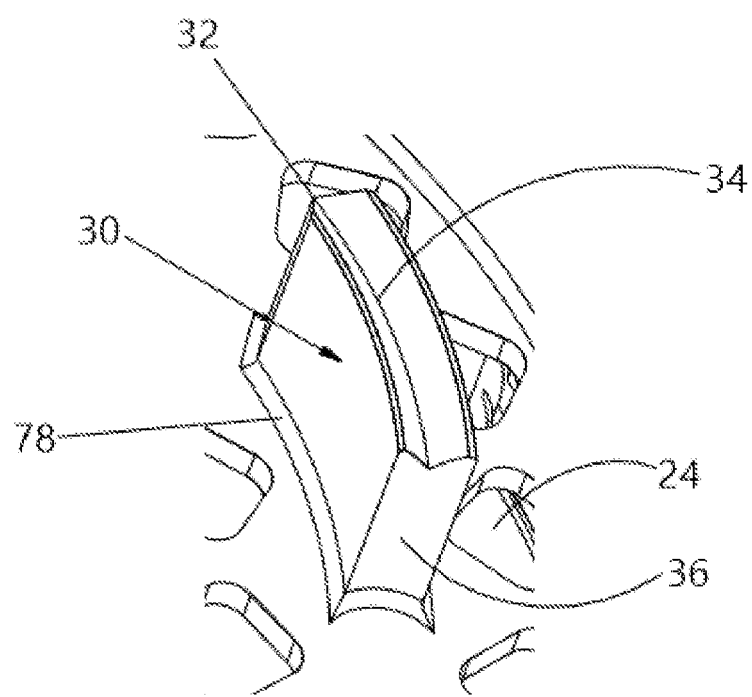
FIG. 8G is a rear perspective view of a tooth of a second section of an herb grinding device.

In one or more embodiments, each tooth 30 of the second section 6 comprises a circular arced tooth 30. More particularly, each circular arced tooth 30 may comprise a center point of the arc at a center of second cavity 22. FIGS. 8F and 8G depict close up views of non-limiting embodiments of a circular arc tooth 30 of the second section 6. According to some aspects, each tooth 30 may comprise one or more of the following: a V-shaped protrusion 32 on a first end of the tooth 30, a crescent shaped recess 36 on a second end of the tooth 30 opposite the first end, and a V-shaped recess 34 on a top end of the tooth 30 opposite the second section floor 20. A V-shaped recess 34 on a top end of the tooth 30 assists in the shearing and/or grinding by allowing the second section 6 to be placed into the first section 4 without the need to smash it in place. The V-shaped recess 34 may comprise an angle of between approximately 30 degrees and 150 degrees. This helps slice down through the unground material rather than just smashing the sections together with brute force. The V-shaped recess 34 on a top end of the tooth 30 also reduces the amount of ground material sticking to the interior of the first cavity 62 and the second cavity 22 by reducing surface area contact.

In the non-limiting embodiment depicted in FIGS. 8F and 8G, each tooth 30 comprises a V-shaped protrusion 32 on a first end of the tooth 30, a crescent shaped recess 36 on a second end of the tooth 30 opposite the first end, and a V-shaped recess 34 on a top end of the tooth 30 opposite the second section floor 20. According to some aspects, each tooth 30 in each concentric teeth ring 40 extends approximately 30 degrees along the respective teeth ring 40. More particularly, a width of each tooth of the plurality of teeth 30 may be between approximately 0.050" and 0.150". The V-shaped portion of each recess or protrusion may be sharp and angular or, alternatively, partially rounded. In one or more embodiments, each tooth 30 comprises a radiused edged 78 at a base of the tooth 30 where the tooth 30 intersects the second section floor 20, thus providing additional strength to the tooth 30. In some, non-limiting embodiments, the plurality of teeth 50 of the first section 4 and the plurality of teeth 30 of the second section 6 are positioned on their respective sections such that the V-shaped protrusions 52 of the plurality of teeth 50 of the first section 4 point opposite the V-shaped protrusions 32 of the plurality of teeth 30 of the second section 6.

According to some aspects, a width of each of the plurality of teeth 30, 50 of the first section 4 and the second section 6 is equal to a distance between adjacent concentric teeth rings 40, 60 of the first section 4 and second section 4. For example, in some embodiments, a width of each tooth of the plurality of teeth 30, 50 may comprise a width of approximately 0.10". In such an embodiment, a gap or distance between the plurality of teeth 50 on a first concentric teeth ring 60 of the first section 4 and the plurality of teeth 30 on an adjacent first concentric teeth ring 40 of the second section 6 is approximately 0.10". Even more particularly, a gap or distance between the magnet boss of each section is also equal to a width of the plurality of teeth 30, 50, and a gap or distance between the outer most centric teeth ring is also equal to a width of the plurality of teeth 30, 50. Such a configuration is advantageous because it results in the exact same consistency when grinding herbs, which is highly desirable. It also ensures an even distribution of ground matter passing in-between the plurality of teeth 30, 50.

Figure 2:
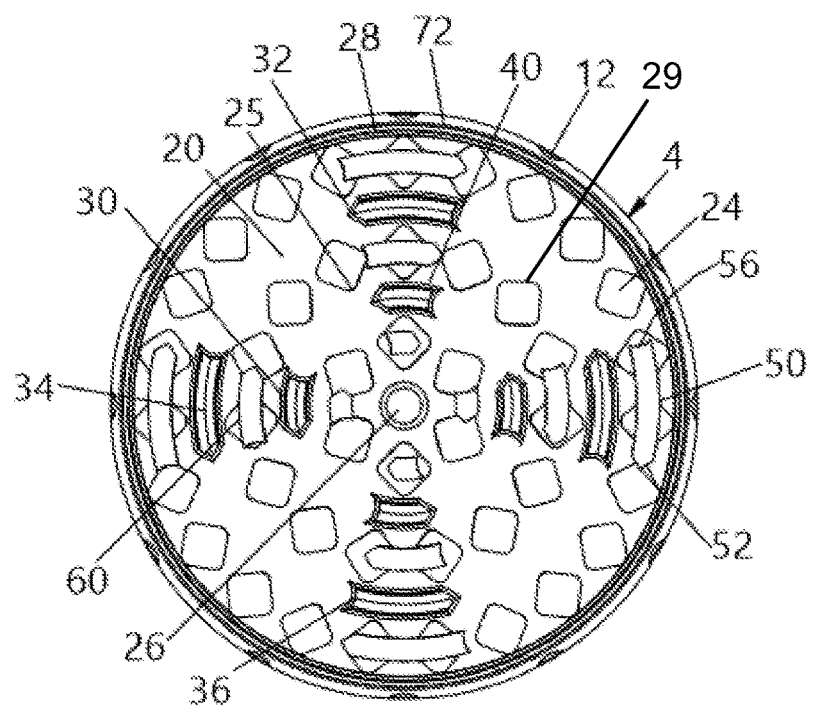
FIG. 2 is a top view of an herb grinding device with a top wall of a first section removed to provide an interior view of the grinding chamber of the herb grinding device.

In one or more embodiments, rotatable coupling of a first section 4 to a second section 6 is enhanced or strengthened by a magnet 26 at the center of the second cavity 22. The magnet 26 may be magnetically attracted to metal of the first section 4 or, alternatively, a magnet 64 positioned at a center of the first section 4. FIG. 2 depicts one such non-limiting embodiment of an herb grinding device 2 wherein the V-shaped protrusions 32 of the plurality of teeth 30 of the second section 6 point in a counter-clockwise direction, while the V-shaped protrusions 52 of the plurality of teeth 50 of the first section 4 point in a clockwise direction. Configuration of the teeth 30, 50 in this manner allows for three different coarseness consistencies of ground herbs: coarse, medium, and fine. For example, a clockwise rotation results in a rough coarseness grind and utilizes the V-shaped protrusions 32, 52 of the teeth 30, 50. A counter-clockwise rotation results in a fine coarseness grind and utilizes the crescent recesses 36, 56 of the teeth 30, 50. A combination of both counter clockwise and clockwise rotations results in a medium coarseness grind and utilizes both edges of the teeth 30, 50. This is unique and different from any other grinder as the traditional grinders only employ one cutting edge, thus resulting in only a single coarseness consistency.

In one or more embodiments, each second section 6 comprises a plurality of holes 24 in the second section floor 20. The plurality of holes 24 may be configured to allow ground herbs to be separated and fall through to the third section 8 and/or fourth section 10 typically positioned below the second section 6. According to some aspects, the plurality of holes 24 are arranged in a plurality of concentric hole rings 29 each comprising a plurality of holes 24. In the non-limiting embodiment depicted in FIGS. 8D & 8E, the second section 6 comprises three concentric hole rings 29 each comprising a plurality of holes 24. More particularly, the plurality of concentric teeth rings 40 may be alternately positioned between the plurality of concentric hole rings 29. For example, the non-limiting embodiment depicted in FIGS. 8D & 8E comprises the following concentric rings, working outward from the center magnet 26 of the second section floor: a first concentric hole ring between the center magnet 26 and a first concentric teeth ring, the first concentric teeth ring between the first concentric hole ring and the second concentric hole ring, the second concentric hole ring between the first concentric teeth ring and a second concentric teeth ring, the second concentric teeth ring between the second concentric hole ring and a third concentric hole ring, and the third concentric teeth ring between the second concentric teeth ring and the annular flange 28. Other embodiments may additional or few alternating concentric teeth and hole rings.

In one or more embodiments, the plurality of concentric hole rings 29 of the second section 6 is positioned to align with the plurality of concentric teeth rings 60 of the first section 4. More particularly, the teeth 50 of the first section 4 may be perfectly positioned on a centerline of a hole 24 of a concentric hole ring 29. This allows for the ground material to pass through the holes in a more efficient manner and allows for creation of a pinch point during grinding. FIG. 2 depicts a non-limiting embodiment of an herb grinding device 2 with a top surface 58 removed to view the grinding chamber 85 of the herb grinding device 2. By way of example and not limitation, FIG. 2 depicts each of the three concentric teeth rings 60 of the first section 4 aligning with a different one of the plurality of concentric hole rings 29 of the second section. According to some aspects, a distance between each concentric teeth ring 40 of the second section 6 and an adjacent concentric teeth ring 60 of the first section 4 is between approximately 0.050" and 0.150" inches when the first section 4 and the second section 6 are rotatably coupled together. It is noted that the aligned and circular arced teeth 30, 50 reduce the shearing and/or grinding friction of conventional systems by allowing smooth lid rotation while slicing the material. Conventional grinding teeth mash and tear, while the circular arced teeth 30, 50 contemplated herein shear and slice, resulting in reduced friction. Such a configuration also helps maintain the integrity of tricombs found on herbal material, which results in a more desirable grinding and/or shearing methodology as it properly prepares the herbs for use without destroying them.

Embodiments of a second section 6 may comprise a plurality of holes 24 of any of a number of shapes and configurations. According to some aspects, each of the plurality of holes 24 may be substantially square shaped, including having rounded corners on the square hole. Square shaped holes 24 may be advantageous to other shapes by allowing the teeth 30, 50 edges to create a pinch point against the square shaped holes 24 to further reduce friction and increase grinder efficiency. Conventional grinders utilize round holes or slots, which do not help the shearing and grinding efficiency because a pinch point is non-existent on a curved or rounded hole. Even more particularly, the plurality of holes 24 may be positioned on the second section floor 20 such that a corner 25 of each of the plurality of holes is pointing or otherwise directed to a center, such as the center magnet 26, of the second section floor 20. In other embodiments, the plurality of holes 24 may comprise other shapes and configurations, such as but not limited to diamond, star, pentagon, hexagon, or triangle.

Figure 5A:
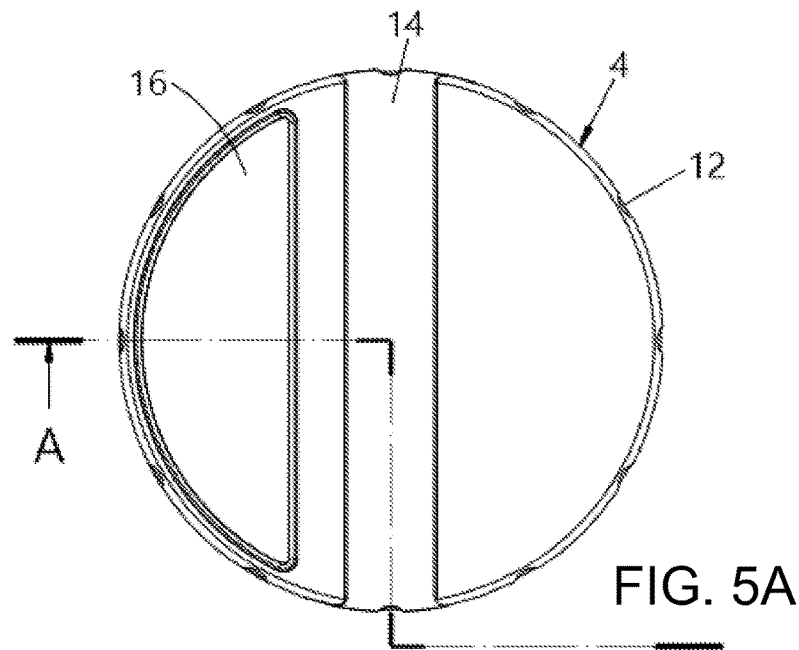
FIG. 5A is a top view of a first and second section of an herb grinding device
Figure 5B:
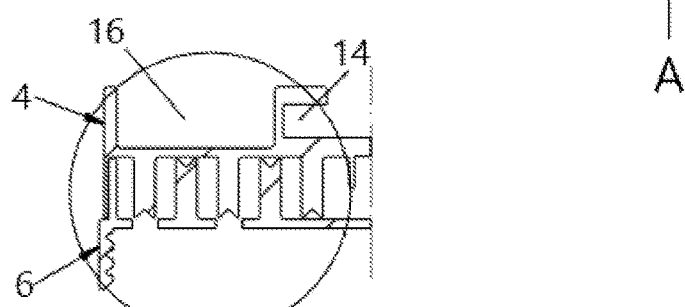
FIG. 5B is a cross sectional view of a first and second section of an herb grinding device taken along sectional line A-A of FIG. 5A.
Figure 5C:
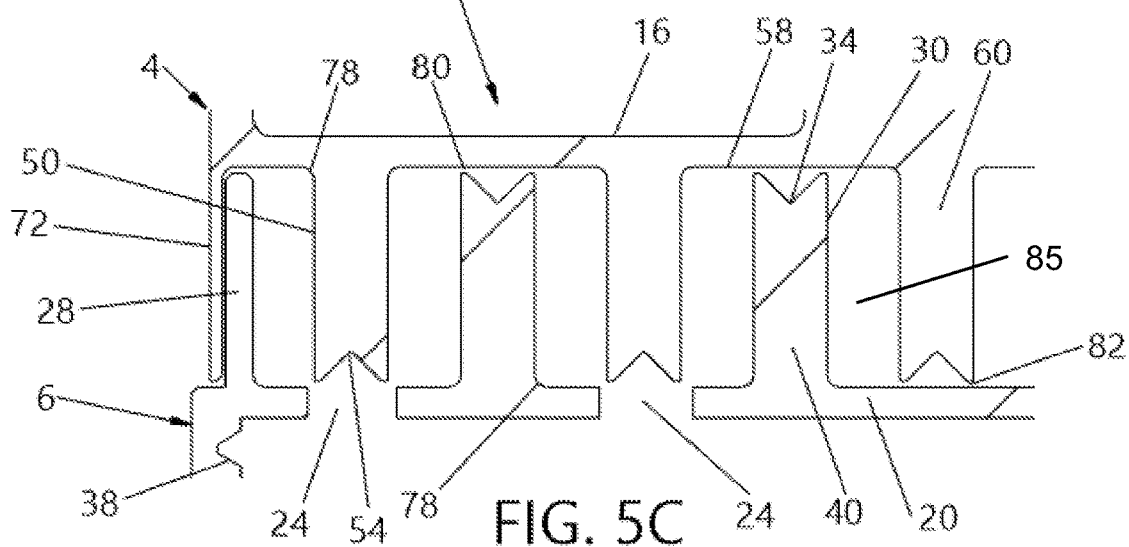
FIG. 5C is an enlarged cross sectional view of the circled portion of FIG. 5B.
Figure 6A:
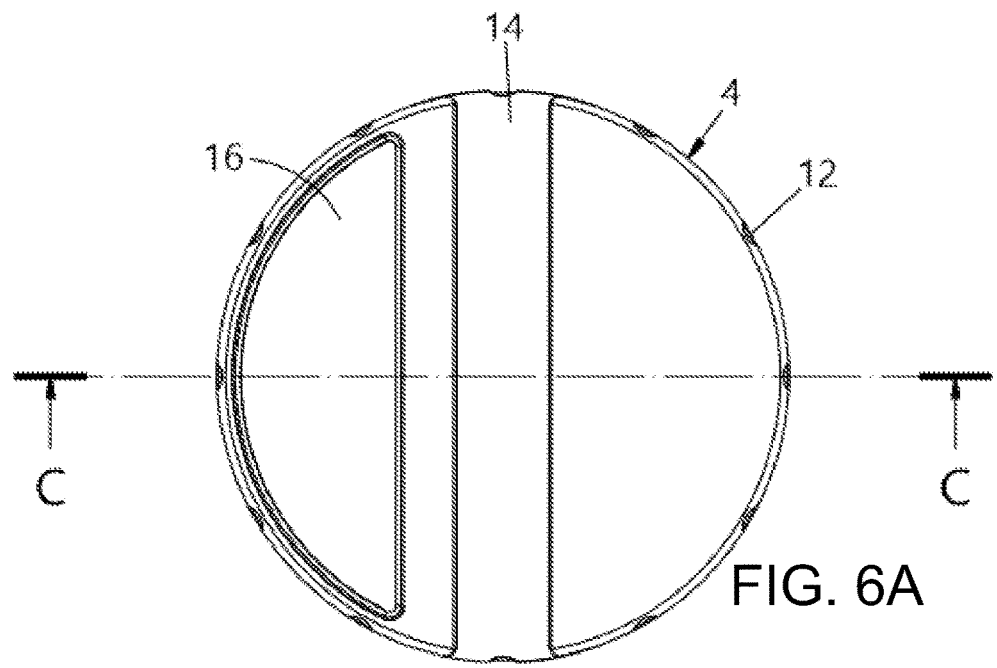
FIG. 6A is a top view of an exploded first and section of an herb grinding device.
Figure 6B:
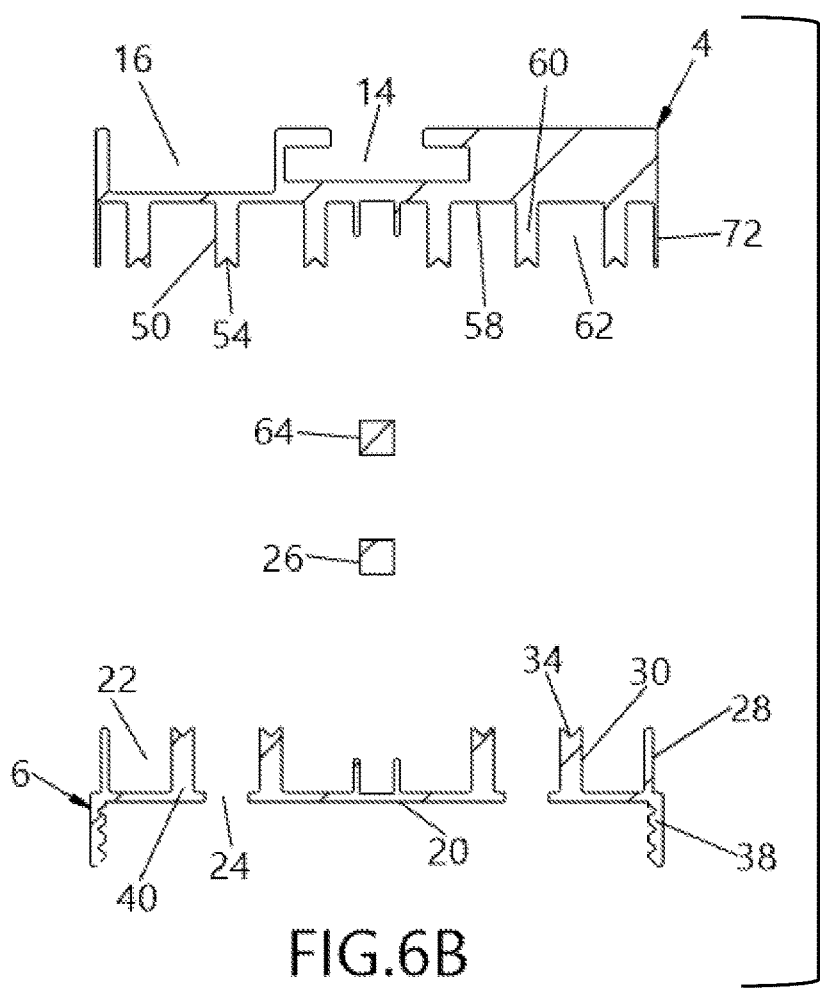
FIG. 6B is a cross sectional view of an exploded first and second section of an herb grinding device taken along sectional line C-C of FIG. 6A.

FIGS. 4B and 5C depict cross sectional views that include a grinding chamber 85 formed by the alignment of a first cavity 62 of a first section 2 and a second cavity 22 of a second section 6. In one or more embodiments, the first cavity 62 and the second cavity 22 are sized such that a small gap 82 exists between the bottom of the plurality of teeth 50 of the first section 4 and the second section floor 2, and a small gap 80 exists between the top of the plurality of teeth 30 of the second section 6. According to some aspects, each gap 80, 82 is approximately 0.010". Such a configuration allows for a shearing and grinding of herbs within a grinding chamber 85 as a first section 4 is rotated relative to a second section 6. The gaps 80, 82 also reduces the build up and accumulation of residue, which eventually clogs the grinding chamber 85. Furthermore, the gaps 80, 82 may also ensure the magnets 26, 64 holding the first section 4 and the second section 6 together remain coupled, thus ensuring a strong magnetic coupling or seal. The teeth of conventional grinders drag directly on the interior cavity floors, which result in the employment of a thick plastic lid ring to elevate the teeth from the floor. This, in turn, does not allow for a magnetic coupling and results in a weaker seal or coupling of the section. Thus, configurations contemplated herein eliminate the need for a thick plastic lid ring typically employed on all other grinders.

In one or more embodiments, a second section 6 is removably coupled to a third section 8. According to some aspects, a second section 6 is threadedly and removably coupled to a third section 8. Even more particularly, a second section 6 may be threadedly coupled to a third section 8 with a plurality of threading notches 66. For example, the non-limiting embodiment depicted in FIGS. 8B and 8E comprises four relief threading notches 66 configured to engage with relief threading notches 38 of the third section 8. The threading notches 66 of the second section 6 may be positioned on an inner surface of the second section 6 below the second section floor 20 and opposite the second cavity 22, while the threading notches 38 of the third section 8 may be positioned on at outer surface of an annular flange of the third section 8 that fits within the second section 6. In other embodiments, the threading notches 66 of the second section 6 may be positioned on an outer surface that fits within a portion of the third section 8. Removably coupling via the four threading notches 66, 38 allows for separation or coupling of the second section 6 and the third section 8 quicker than a conventional thread that has to be unscrewed and rotated multiple times before being completely coupled or uncoupled. Utilization of four relief threading notches allows a standard UNF thread to be conjoined and un-joined without the need to continuously rotate the respective sections. Instead, sections may be coupled or uncoupled with a simple one-quarter turn of one of the sections. According to some aspects, the threading notches 38, 66 comprise a low threads per inch (TPI), such as but not limited to a 12-6 TPI. In one or more embodiments, the female side threading notches contemplated in this disclosure is separated into eight segments that alternate evenly between thread-gap-thread-gap. The gaps in the female connection of the quick lock thread serve as relief for coupling the male side of the adjacent section.

Figure 9A:
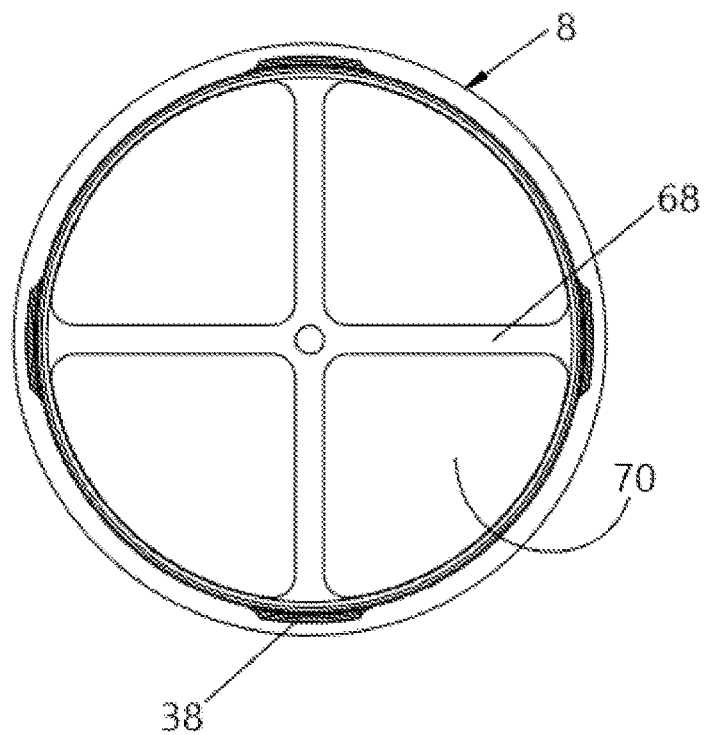
FIG. 9A is a top view of a third section of an herb grinding device.
Figure 9B:
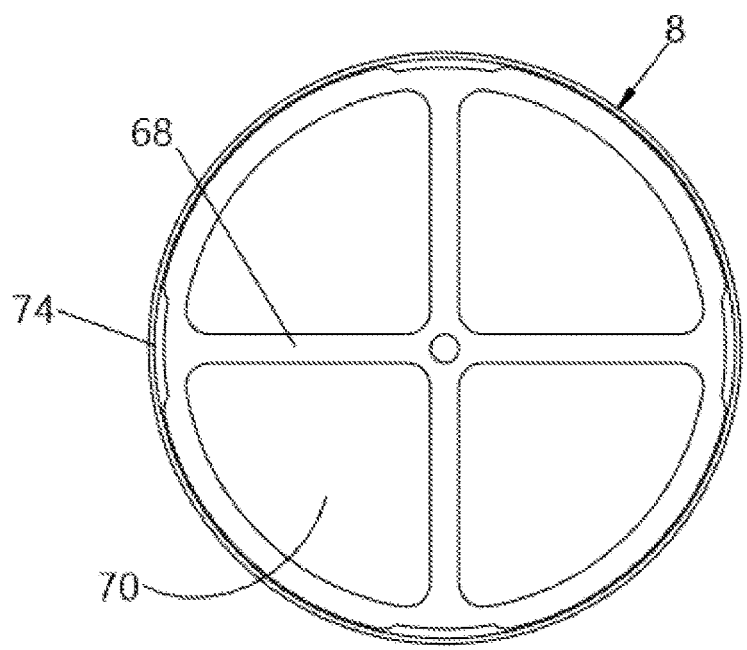
FIG. 9B is a bottom view of a third section of an herb grinding device.
Figure 9C:
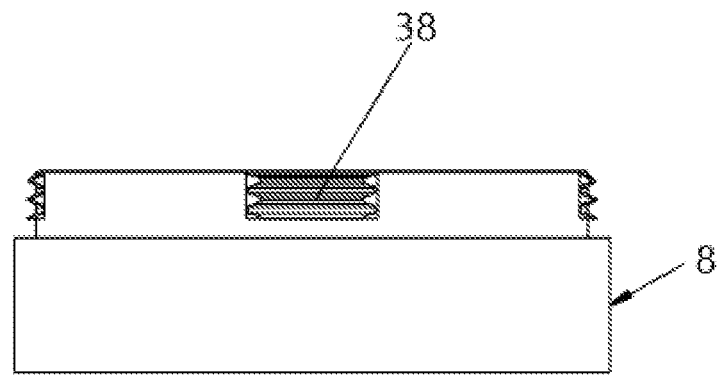
FIG. 9C is a side view of a third section of an herb grinding device.
Figure 9D:
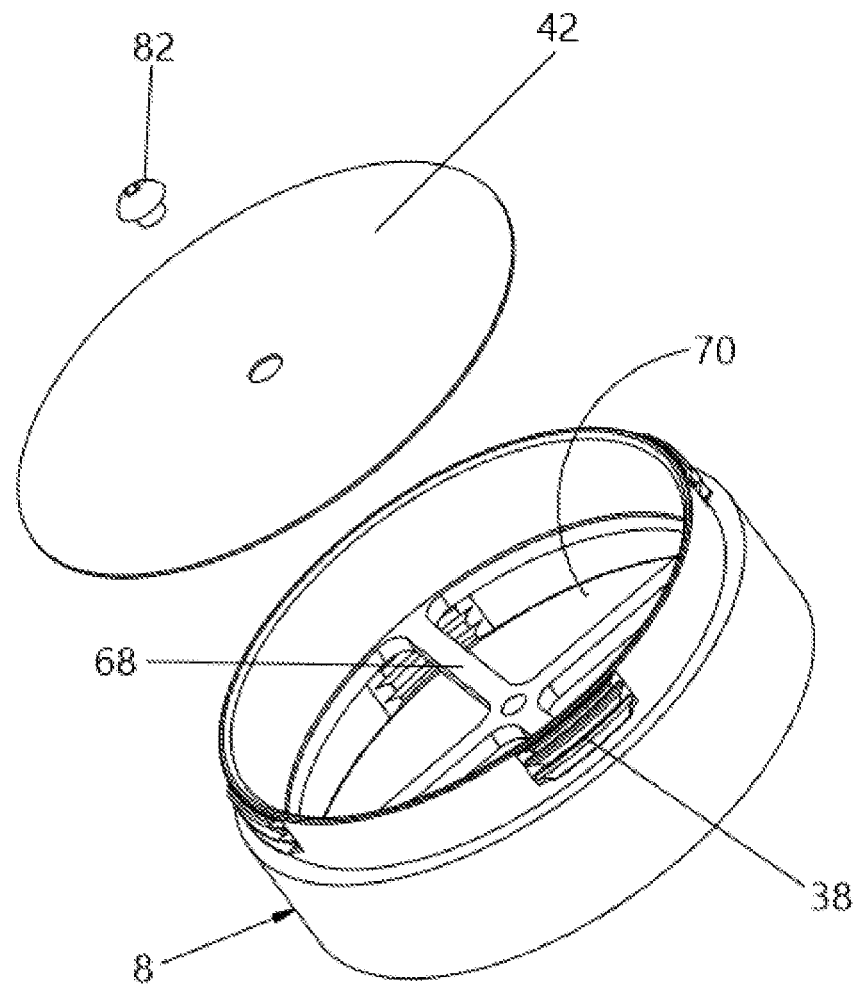
FIG. 9D is an exploded view of a third section of an herb grinding device.
Figure 9E:
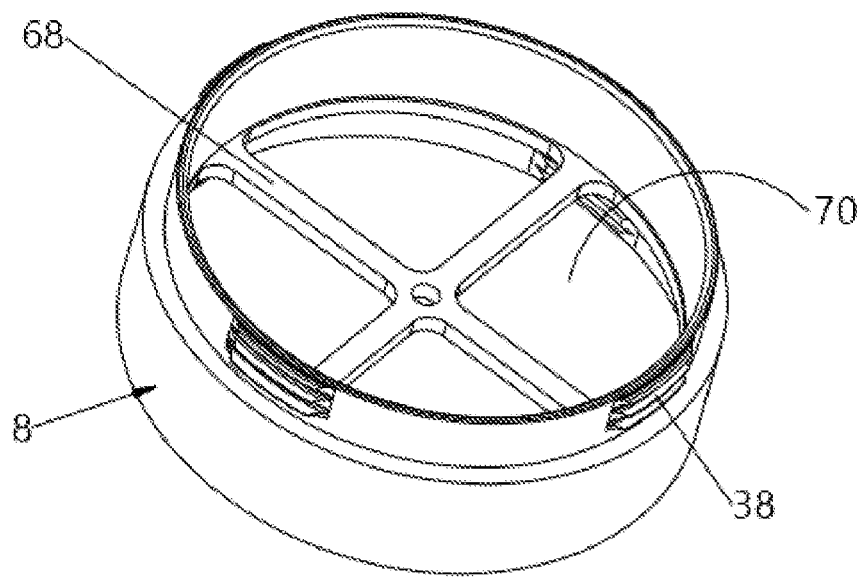
FIG. 9E is a perspective view of a third section of an herb grinding device without a screen.
Figure 10A:
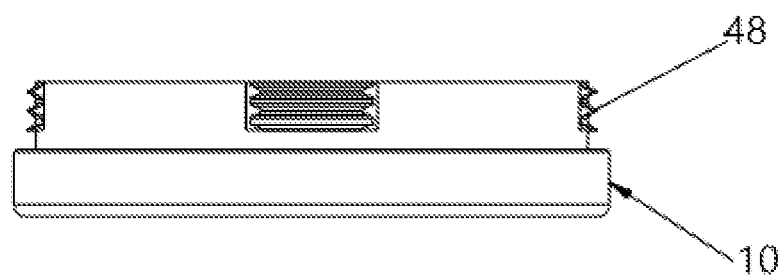
FIG. 10A is a side view of a fourth section of an herb grinding device.
Figure 10B:
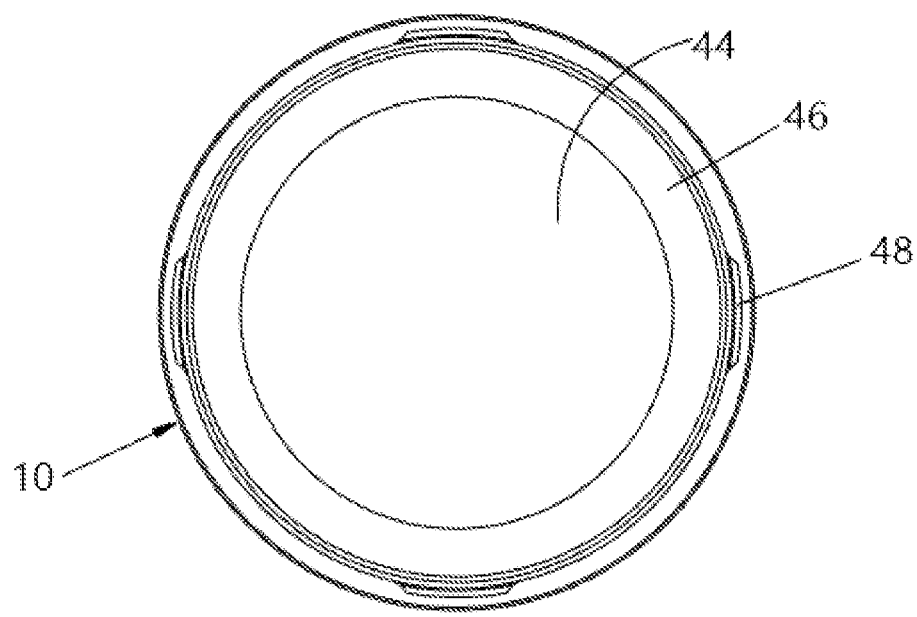
FIG. 10B is a top view of a fourth section of an herb grinding device.
Figure 10C:
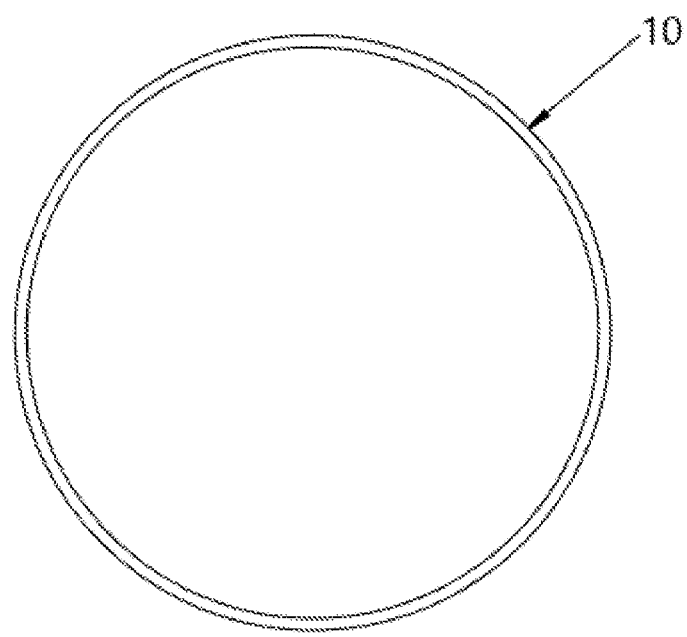
FIG. 10C is a bottom view of a fourth section of an herb grinding device.
Figure 10D:
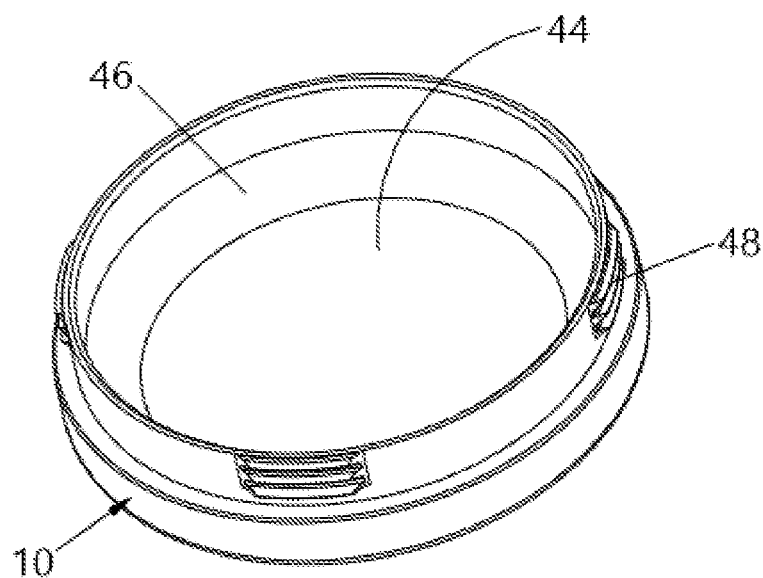
FIG. 10D is a top perspective view of a fourth section of an herb grinding device.
Figure 10E:
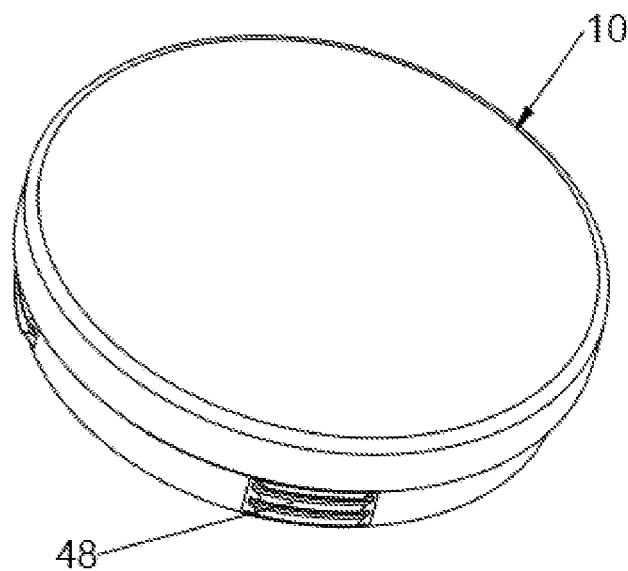
FIG. 10E is a bottom perspective view of a fourth section of an herb grinding device.

FIGS. 9A-9E depict various view of a non-limiting embodiment of a third section 8 of an herb grinding device 2. A third section 8 may be configured to filter finely ground herbs. According to some aspects, a third section 8 comprises a channel 70 extending through a cylindrical third section 8 and on or more support arms 68 extending across the channel 70. In some embodiments, the one or more support arms 68 comprise a cross brace support arms 68. Cross brace support arms 68 may be configured to support a bottom surface of a screen 42 coupled to the cross brace support arms 68 with a screw 82 such that the screen 42 is positioned within the channel 70. FIG. 9D provides an exploded perspective view of a third section 8 comprises a screen 42, and FIG. 3A provides a perspective view of a third section 8 with a screen 42 coupled to the cross brace support arms 68 in the third section 8. The screen may comprise one of a fine, medium, or coarse woven mesh, stainless steel, or titanium. An outer edge of a screen 42 may be held in place within the third section 8 with a small groove on an inner surface of the channel 70 just above the cross brace support arms 68. Utilizing one or more support arms 68, such as cross brace support arms 68 is advantageous to conventional devices because the support arms 68 support the screen 42, rather than unsupported screens stretched across the device like a drum in conventional systems. Such conventional mounting of a screen results in tearing and stretching of the screen over time. In contrast, support of the screen 42 with support arms 68 prevents stretch and tearing, and allows for easy replacement of the screen 42.

As previously noted, a third section 8 may comprise threading notches 38 on an annular flange of the third section 8 for coupling of the third section 8 to a second section 6. According to some aspects, a third section 8 is threadedly and removably coupled to a fourth section 10. Even more particularly, a third section 8 may be threadedly coupled to a fourth section 10 with a plurality of threading notches 74. For example, the non-limiting embodiment depicted in FIG. 9B comprises four relief threading notches 74 configured to engage with relief threading notches 48 of the fourth section 10. The threading notches 74 of the third section 8 may be positioned on an inner surface of the third section 8 below the support arms 68, while the threading notches 48 of the fourth section 10 may be positioned on at outer surface of an annular flange of the fourth section 10 that fits within the third section 8. In other embodiments, the threading notches 74 of the third section 8 may be positioned on an outer surface that fits within a portion of the fourth section 10. Removably coupling via the four threading notches 74, 48 allows for separation or coupling of the third section 8 and the fourth section 10 quicker than a conventional thread that has to be unscrewed and rotated multiple times before being completely coupled or uncoupled. Utilization of four relief threading notches allows a standard UNF thread to be conjoined and un-joined without the need to continuously rotate the respective sections. Instead, sections may be coupled or uncoupled with a simple one-quarter turn of one of the sections. According to some aspects, the threading notches 74, 48 comprise a low threads per inch (TPI), such as but not limited to a 12-6 TPI.

FIGS. 10A-E depict various views of a non-limiting embodiment of a fourth section 10 of an herb grinding device. A fourth section 10 may be configured to store finely ground particles and/or pollen. As previously noted, a fourth section 10 is configured to be removably coupled to a third section 8. The fourth section 10 may couple to the third section 8 with threading notches 48. In one or more embodiments, a fourth section 10 comprises a collection cavity 44. The collection cavity 44 is configured to collect the grindings of herbs ground in the grinding chamber 85 of the first section 4 and the second section 6. According to some aspects, the collection cavity 44 comprises a radiused edge 46. The radiused edge 46 of the collection cavity 44 allow for easy removal of finely filtered particles and solves the traditional problem of particles getting trapped in the corners of a collection cavity. This configuration allows for a standard guitar pick to contour the radiused edge 46 of the collection cavity 44 to assist in fine pollen removal. It is also configured for use of a finger to remove or scoop the particles from the collection cavity 44. It is further contemplated that the fourth section 10 comprising a collection cavity 44 may be removably coupled to the second section 6 comprising a second section floor as previously described. That is, in some embodiments, a third section 8 is not necessary. Coupling of the fourth section 10 to the second section 6 may be similar to the coupling of a third section 8 to a second section 6.

Figure 11:
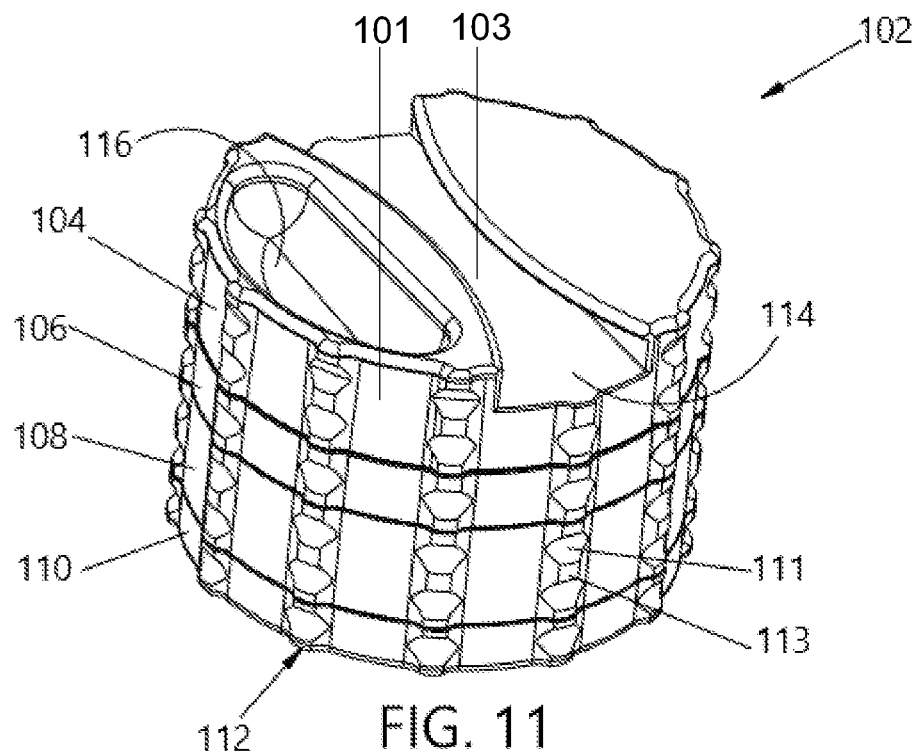
FIG. 11 is a perspective view of a second embodiment of an herb grinding device.

FIGS. 11-21 depict various views of another non-limiting embodiment of an herb-grinding device. In one or more embodiments, an herb grinding device 102 is relatively lightweight and portable, and yet very strong. By way of example and not limitation, an herb grinding device 102 may be manufactured from 6061 or 7075 grade aluminum, 304 stainless, or T2 titanium. According to some aspects, an herb grinding device 102 comprises at least a first section 104 and a second section 106. Other contemplated embodiments may comprise a third section 108 and/or a fourth section 110, although these sections are not required in all embodiments. Although reference is made in this description and in the figures to substantially cylindrical sections of an herb grinding device 102, it is contemplated that the exterior of the herb grinding device 102 is not always cylindrical and may, instead, comprise any other geometric shapes and configurations. FIG. 11 provides a perspective view of a non-limiting embodiment of a herb grinding device 102 comprising a first section 104 coupled to a second section 106, a third section 108 coupled to the second section 106 opposite the first section 104, and a fourth section 110 coupled to the third section 108 opposite the second section 106. FIGS. 13A and 13B provide exploded top and bottom perspective views, respectively, and FIG. 14B provides a cross sectional view of non-limiting embodiment of an herb grinding device 102 comprising a first section 104, a second section 106, a third section 108, and a fourth section 110. Details of each of the sections shall be provided below.

In one or more embodiments, an herb grinding device 102 comprises a first section 104 rotatably and removably coupled to a second section 106. FIGS. 17A-17F depict various views of a non-limiting embodiment of a first section 104. According to some aspects, a first section 104 comprises a substantially cylindrical first section 104 having a cylindrical first cavity 162 within a portion of the cylindrical first section 104. In other embodiments, a first section may comprise other geometric configurations on the outside of the first section, and maintain a cylindrical first cavity 162 within a portion of the first section. The first cavity 162 may be bordered by circular outer wall 172 and a top surface 158, and comprise an opening opposite the top surface 158. According to some aspects, the first cavity 162 comprises a depth of between approximately 0.25" and 0.75". The outer wall 172 is sized to receive a portion of the second section 106 within the first cavity 162 or, alternatively, fit within a portion of the second section 106.

In one or more embodiments, a first section 104 comprises a plurality of teeth 150. According to some aspects, the plurality of teeth 150 extend from the top surface 158 of the first section and are positioned to form a plurality of concentric teeth rings 160, with each concentric teeth ring 160 comprising a plurality of teeth 150. In the non-limiting embodiment depicted in FIGS. 17A-17F, the first section 104 comprises four concentric teeth rings 60, with each concentric teeth ring 160 comprising four equally spaced apart teeth 150. In other embodiments, a first section 104 may comprise any number of concentric teeth rings 160 and any number of teeth 150 within each concentric teeth ring 160. Each concentric teeth ring 160 comprises a center aligned with a center of the first cavity 162. In the non-limiting embodiment depicted in FIG. 17B, for example, a magnet 164 is positioned at a center of the first cavity 162 of the first section 104. The magnet 164 may be surrounded by a toothed magnet mount that aids in the grinding of herbs within the cavity. According to some aspects, the plurality of teeth 150 within each concentric teeth ring 160 may be aligned with the plurality of teeth 150 within each adjacent teeth ring 160. For example, in some embodiments, the four teeth 150 in each concentric ring 160 are aligned with the four teeth in the adjacent concentric teeth ring 160, the center of each tooth 150 within each concentric teeth ring 160 being approximately 90 degrees from the center of adjacent teeth of the same concentric teeth ring 160. That is, the teeth 150 of adjacent teeth rings 160 are aligned, but narrow in radial length towards a center of the first cavity 162 in a pie-shaped configuration. Thus, a pie-shaped configuration of space may exist between aligned teeth 150. In other embodiments, such as the non-limiting embodiment depicted in FIG. 17B, the plurality of teeth 150 within each concentric teeth ring 160 are not aligned but instead offset from a plurality of teeth 150 of an adjacent concentric teeth ring 160. In some embodiments, the plurality of teeth 150 within each concentric teeth ring 160 are offset from a plurality of teeth 150 of an adjacent concentric teeth ring 160 by between approximately 15 to approximately 25 degrees, approximately 20 to approximately 35 degrees, approximately 40 to approximately 50 degrees, approximately 11.25 degrees, approximately 22.5 degrees, or approximately 30 degrees, approximately 45 degrees.

Figure 17A:
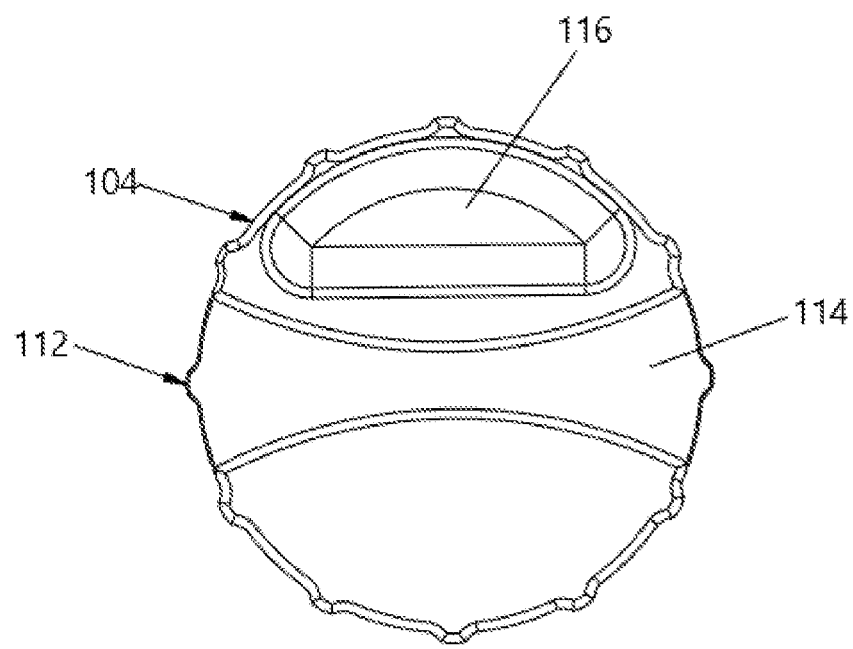
FIG. 17A is a top view of a first section of a second embodiment of an herb grinding device.
Figure 17B:
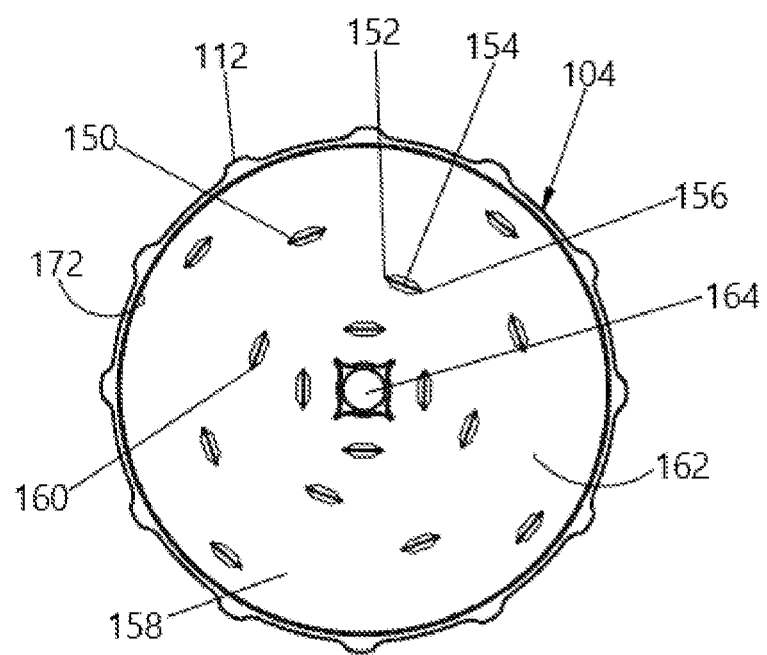
FIG. 17B is a bottom view of a first section of a second embodiment of an herb grinding device.
Figure 17C:
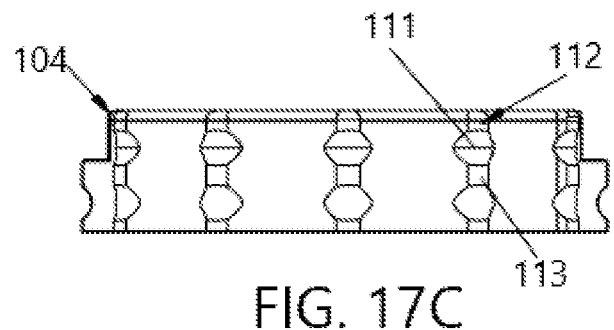
FIG. 17C is a first side view of a first section of a second embodiment of an herb grinding device.
Figure 17D:
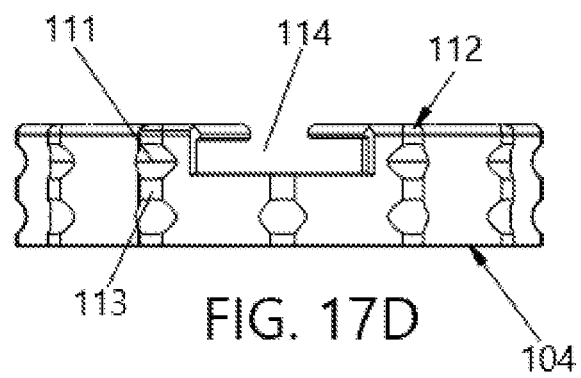
FIG. 17D is a second side view of a first section of a second embodiment of an herb grinding device.
Figure 17E:
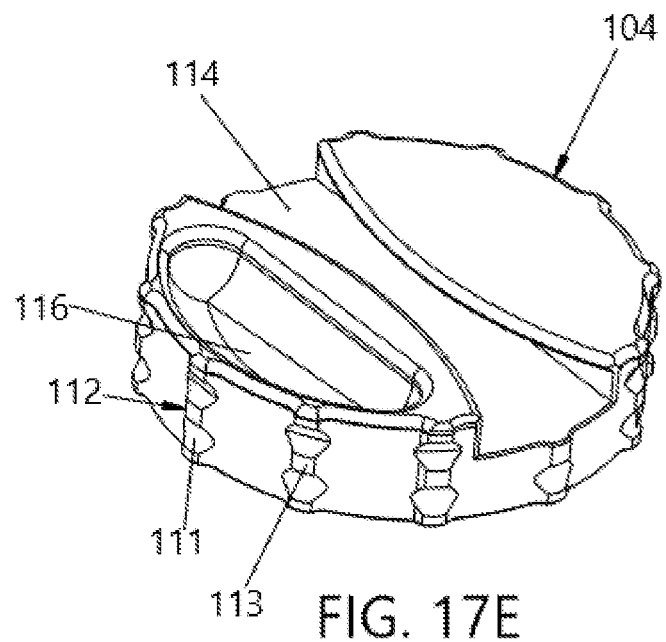
FIG. 17E is top perspective view of a first section of a second embodiment of an herb grinding device.
Figure 17F:
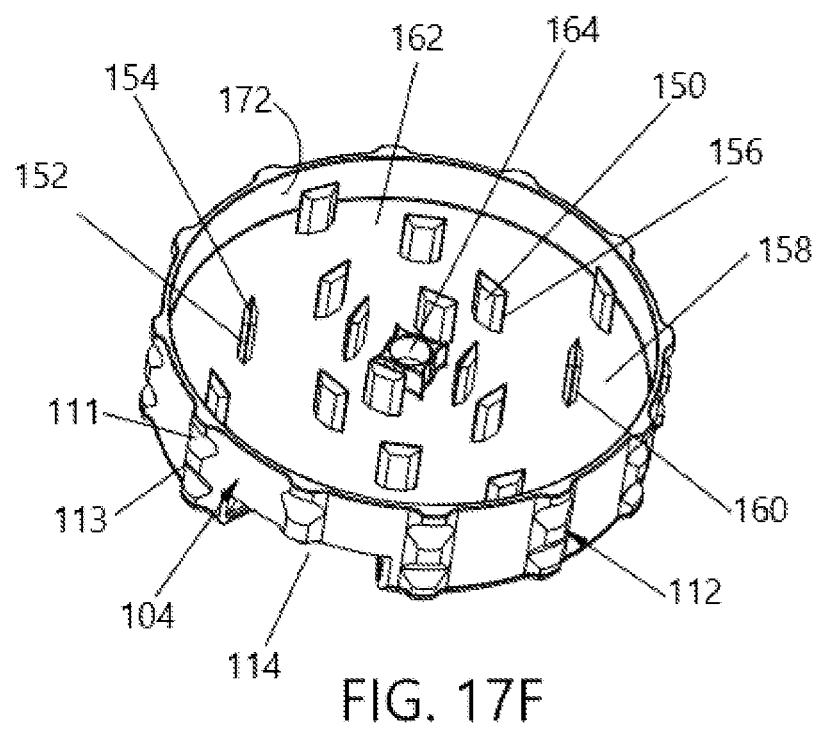
FIG. 17F is a bottom perspective view of a first section of a second embodiment of an herb grinding device.
Figure 17G:
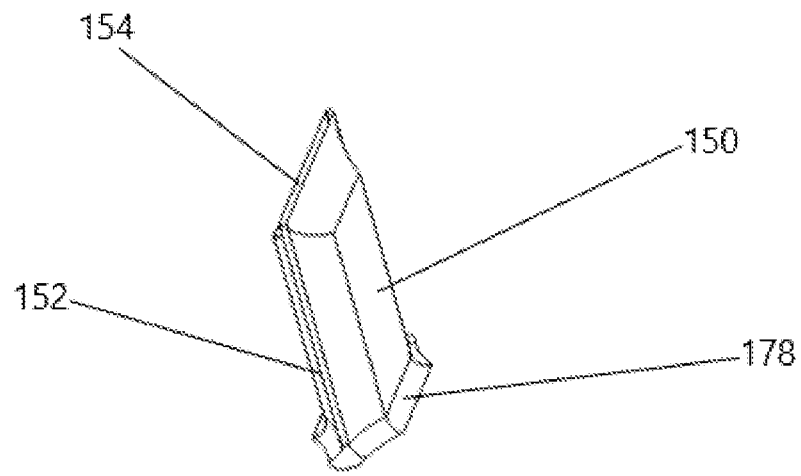
FIG. 17G is a front perspective view of a tooth of a first section of a second embodiment of an herb grinding device.
Figure 17H:
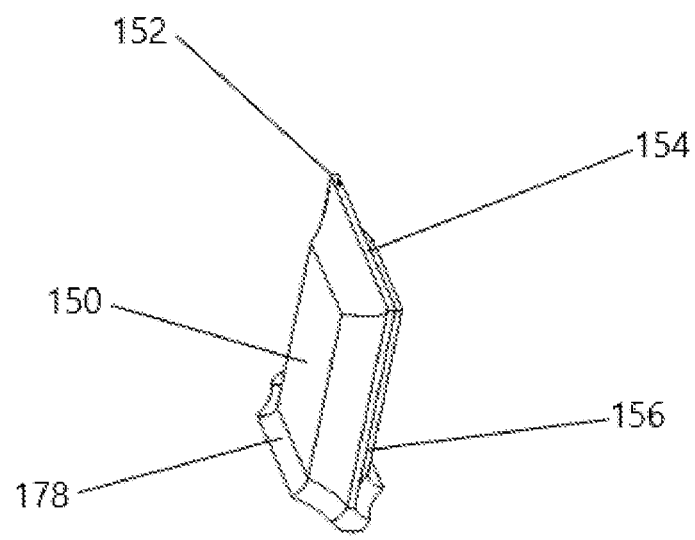
FIG. 17H is a rear perspective view of a tooth of a first section of a second embodiment of an herb grinding device.

In some embodiments, each tooth of the first section 104 is comprises a tooth 50 described elsewhere in this document. In other embodiments, each tooth 150 of the first section 104 comprises a substantially planar tooth 150. Substantially planar teeth 50 are advantageous to conventional teeth because substantially planar teeth are extremely strong and unbreakable due to the elongation of the substantially planar teeth 150. Conventional teeth are typically post teeth, which are prone to breaking when enough force is applied. Substantially planar teeth 150 are also more elongated teeth 150 than conventional post teeth, and allow the ground material to essentially roll between the teeth 150 and become compacted, which then allows the material to fall through the holes 124 with less effort. FIGS. 17G and 17H depict close up views of non-limiting embodiments of a substantially planar tooth 150 of the first section 104.

According to some aspects, each tooth 150 may comprise one or more of the following: a V-shaped protrusion 152 on a first end of the tooth 150, a V-shaped protrusion 156 on a second end of the tooth 150 opposite the first end, and a V-shaped protrusion 154 on a bottom end of the tooth 150 opposite the top surface 158. The V-shaped protrusion 154 may comprise an angle of between approximately 30 degrees and 150 degrees. A V-shaped protrusion 154 on a bottom end of the tooth 150 assists in the shearing and/or grinding by allowing the first section 104 to be placed on to the second section 106 without the need to smash it in place. This helps slice down through the unground material rather than just smashing the sections together with brute force. The V-shaped protrusion 154 on a bottom end of the tooth 150 also reduces the amount of ground material sticking to the interior of the first cavity 162 and the second cavity 122 by reducing surface area contact. In other embodiments, the substantially planar teeth may comprise the V-shaped or crescent-shaped recesses described in other teeth elsewhere in this document.

In the non-limiting embodiment depicted in FIGS. 17G and 17H, each tooth comprises a V-shaped protrusion 152 on a first end of the tooth 150, a V-shaped protrusion 156 on a second end of the tooth 150 opposite the first end, and a V-shaped protrusion 154 on a bottom end of the tooth 150 opposite the top surface 158. According to some aspects, each tooth 150 in each concentric teeth ring 160 comprises substantially equal dimensions, while in other embodiments, teeth 150 increase in size as the concentric teeth ring 160 is further from the center. Each tooth of the plurality of teeth 150 may comprise a length of approximately 0.25", approximately 0.33", approximately 0.50", approximately 0.66", approximately 0.75", or approximately 1.00". In some embodiments, a width of each tooth of the plurality of teeth 150 may be between approximately 0.050" and 0.150". The V-shaped portion of each protrusion may be sharp and angular. In one or more embodiments, each tooth 150 may comprise a radiused edged 178 at a base of the tooth 150 where the tooth 150 intersects the top surface 158, thus providing additional strength to the tooth 150.

In one or more embodiments, rotatable coupling of a first section 4 to a second section 106 is enhanced or strengthened by a magnet 164 at the center of the first cavity 162, such as but not limited to a neodymium magnet. The magnet 164 may be magnetically attracted to metal of the second section 106 or, alternatively a magnet 126 positioned at a center of the second section 106. Magnetic coupling of the first section 104 and the second section 106 is advantageous because it prevents the sections from separating during rotation of the first section and grinding, while still allowing for easy and quickly removal of the first section 104 from the second section 6 to insert herbs into the grinding device 102. More particularly, each magnet 164, 126 may be held in place on the respective first section 104 or second section by a magnet boss on each section. The magnet boss may include teeth to aid in grinding. In some embodiments, a magnet boss of the second section 106 is equal distance from the second section floor 120 as a magnet boss of the first section 104 is from the top surface 158. This allows the magnets 164, 126 to meet and contact each other a center point between the top surface 158 and the second section floor 120. Such a configuration inhibits material from getting stuck between the magnets and weakening the magnetic coupling between the magnets 164, 126. In other embodiments, any other coupling devices known in the art may be utilized.

In one or more embodiments, a first section 104 may comprise at least one of a recessed outer cavity 116, a T-shaped slot 114, and a plurality of grips 112. The recessed outer cavity 116 is positioned on an outside surface 103 of the first section 104 opposite the first cavity 162 and may be sized to function as an ash tray on the herb grinding device 102. According to some aspects, the recessed outer cavity comprises a width approximately one-third a diameter of the first section 104. Although the embodiment depicted in FIG. 17A comprises only a single recessed outer cavity 116, it is contemplated that some embodiments may comprise two recessed outer cavities 116, with a T-shaped slot 114 being positioned between the two recessed outer cavities 116. A t-shaped slot 114 may be sized to allow for a standard rolling papers sleeve package to be held in place within the T-slot 114. The T-slot may comprise convex top surface extending toward one another. This allows rolling papers to be dispensed through the top surface of the first section 104 and helps prevent loss or misplacement of the rolling papers by the user.

One or more embodiments of a first section 104 further comprise a plurality of grips 112 on an outer circumference of the first section 104. According to some aspects, each of the plurality of grips 112 may comprise alternating grip protrusions 113 and grip recesses 111 positioned axially along an outer perimeter 101 of the first section 104. In one or more embodiments, each of the first 104, second 106, third 108, and fourth 110 sections each comprise a plurality of grips 112 extending axially along an outer perimeter 101 of each respective section. More particularly, the plurality of grips 112 on the second 106, third 108, and fourth 108 sections may align axially when the male lock notch 133 of the third section 108 is engaged with the female lock notch 166 of the second section 106 and the male lock notch 148 of the fourth section 110 is engaged with the female lock notch 174 of the third section 108. The grips 112 allow for a more natural grip of the hand and fingers. Thus, a user need apply significantly less pressure when rotating the lid as compared to the conventional knurl style grip.

As previously noted an herb grinding device 102 of this disclosure may further comprise a second section 106 rotatably coupled to a first section 104. FIGS. 18A-18E depict a non-limiting embodiment of a second section 106. According to some aspects, a second section 106 comprises a substantially cylindrical second section 106 having a cylindrical second cavity 122 within a portion of the cylindrical second section 106. In other embodiments, a second section may comprise other geometric configurations on the outside of the second section, and maintain a cylindrical second cavity 122 within a portion of the second section. The second cavity 122 may be bordered by annular flange 128 and a second section floor 120, and comprise an opening opposite the second section floor 120. According to some aspects, a second cavity 122 comprises a depth between approximately 0.25" and 0.75". The annular flange 128 according to some aspects is sized to fit within the first cavity 162 and interface with or be adjacent to the outer wall 172 of the first section 104. This configuration allows the first section 104 to rotate freely about the annular flange 128 in either direction. This configuration also reduces residue buildup and accumulation because the annular flange 128 fits within the first section 104. Accordingly, a slight space may exist between the interfaced outer wall 172 and annular flange 128 to allow rotation of the first section 104 relative to the second section 106. In other embodiments, the annular flange 128 is sized to receive a portion of the first section 104 to allow rotation of the first section 104 within the second cavity 122.

In one or more embodiments, a second section 106 comprises a plurality of teeth 130. According to some aspects, the plurality of teeth 130 extend from second section floor 120 within the second cavity 122 of the second section 106 and are positioned to form a plurality of concentric teeth rings 140, with each concentric teeth ring 140 comprising a plurality of teeth 130. In the non-limiting embodiment depicted in FIGS. 18A-18E, the second section 106 comprises three concentric teeth rings 140, with each concentric teeth ring 140 comprising four equally spaced apart teeth 130. In other embodiments, a second section 106 may comprise any number of concentric teeth rings 140 and any number of teeth 130 within each concentric teeth ring 140. Each concentric teeth ring 140 comprises a center aligned with a center of the second cavity 122. In the non-limiting embodiment depicted in FIG. 18A, for example, a magnet 126 is positioned at a center of the second cavity 122 of the second section 106. According to some aspects, the plurality of teeth 130 within each concentric teeth ring 140 may be aligned with the plurality of teeth 130 within each adjacent teeth ring 140. For example, four teeth 130 in each concentric ring 140 may be aligned with the four teeth 130 in the adjacent concentric teeth ring 140, each tooth 130 within each concentric teeth ring 140 being approximately 90 degrees from the adjacent teeth of the same concentric teeth ring 140. That is, the teeth 130 of adjacent teeth rings 140 are aligned, but narrow in length towards a center of the second cavity 122 in a pie-shaped configuration. Thus, a pie-shaped configuration of space may exist between aligned teeth 130. In other embodiments, such as the non-limiting embodiment depicted in FIG. 18A, the plurality of teeth 130 within each concentric teeth ring 140 are not aligned but instead offset from a plurality of teeth 130 of an adjacent concentric teeth ring 140. In some embodiments, the plurality of teeth 130 within each concentric teeth ring 140 are offset from a plurality of teeth 130 of an adjacent concentric teeth ring 140 by between approximately 15 to approximately 25 degrees, approximately 20 to approximately 35 degrees, approximately 40 to approximately 50 degrees, approximately 11.25 degrees, approximately 22.5 degrees, or approximately 30 degrees, approximately 45 degrees.

Figure 18A:
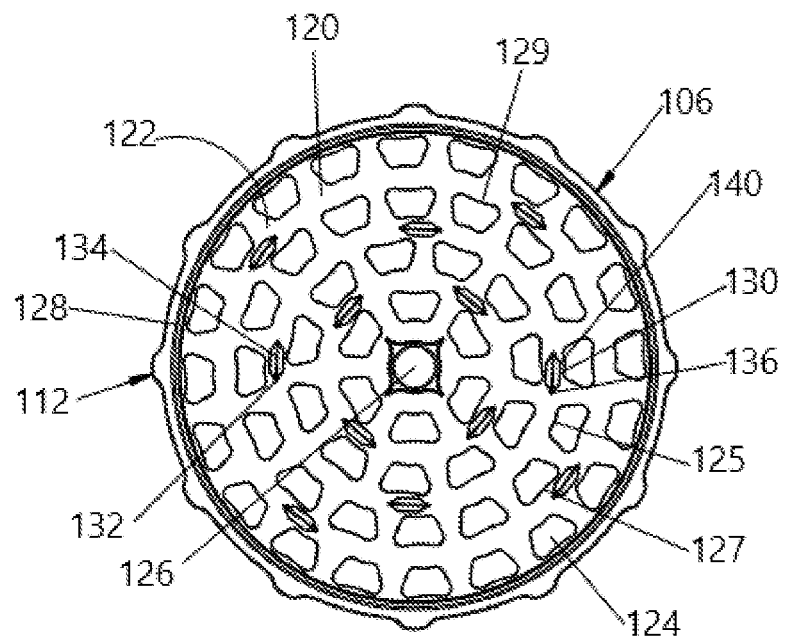
FIG. 18A is a top view of a second section of a second embodiment of an herb grinding device.
Figure 18B:
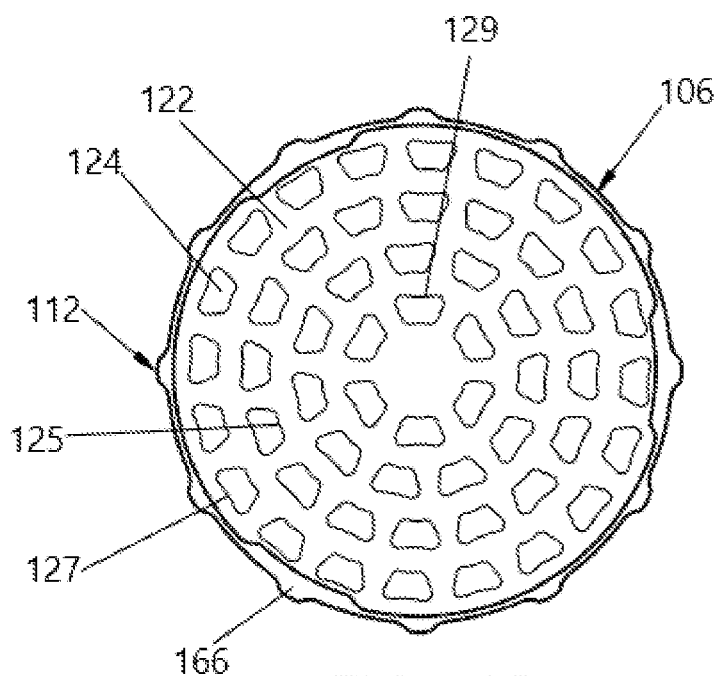
FIG. 18B is a bottom view of a second section of a second embodiment of an herb grinding device.
Figure 18C:
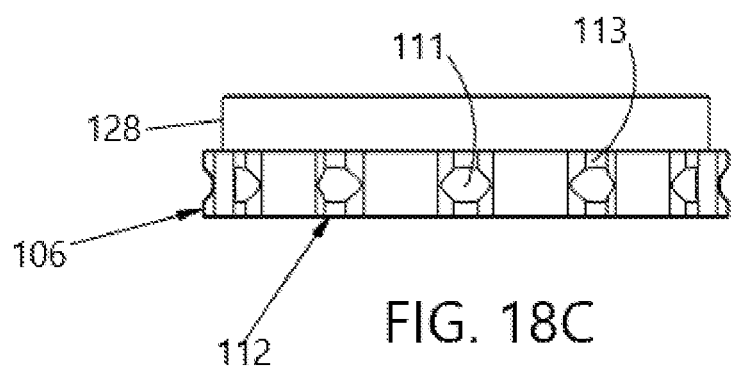
FIG. 18C is a side view of a second section of a second embodiment of an herb grinding device.
Figure 18D:
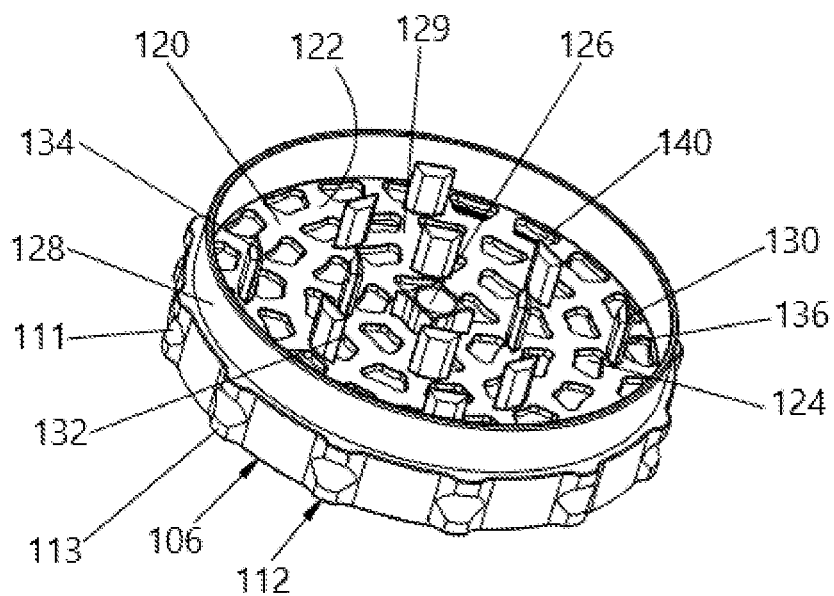
FIG. 18D is a top perspective view of a second section of a second embodiment of an herb grinding device.
Figure 18E:
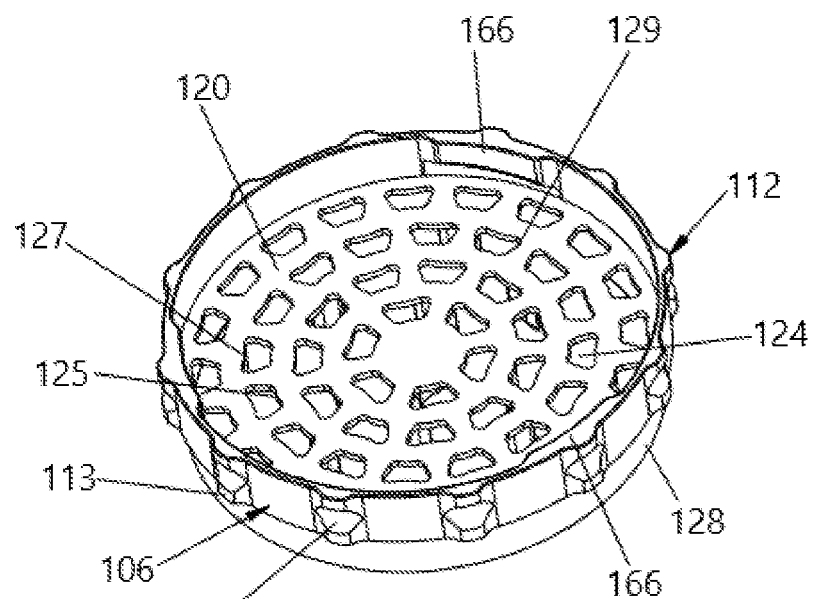
FIG. 18E is a bottom perspective view of a second section of a second embodiment of an herb grinding device.
Figure 18F:
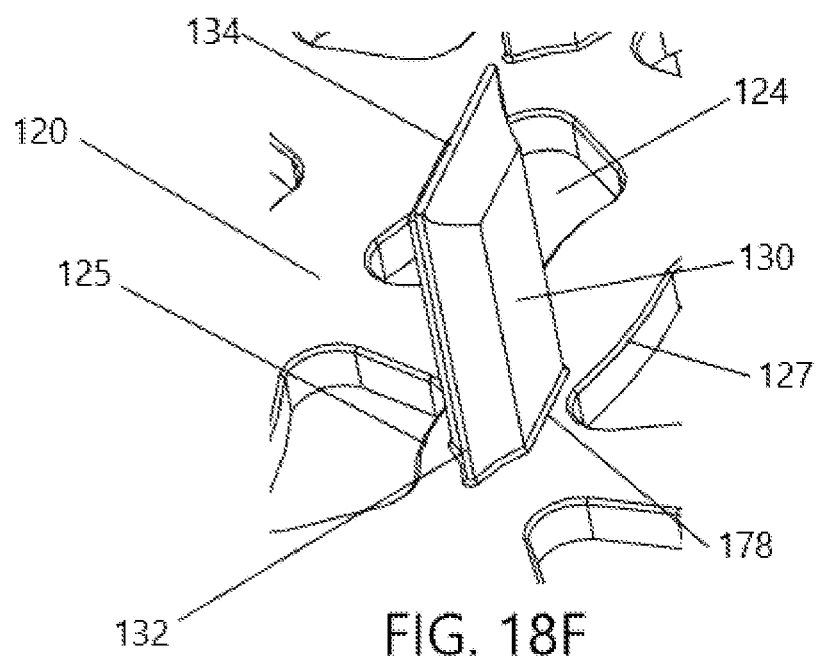
FIG. 18F is a front perspective view of a tooth of a second section of a second embodiment of an herb grinding device.
Figure 18G:
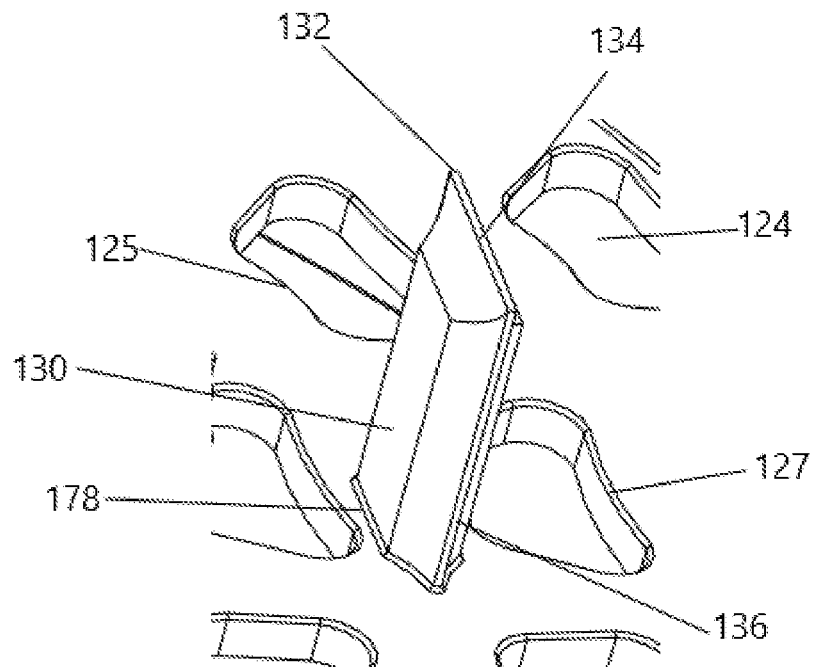
FIG. 18G is a rear perspective view of a tooth of a second section of a second embodiment of an herb grinding device.

In one or more embodiments, each tooth 130 of the second section 106 comprises a substantially planar tooth 130. FIGS. 18F and 18G depict close up views of non-limiting embodiments of a circular arc tooth 130 of the second section 106. According to some aspects, each tooth 130 may comprise one or more of the following: a V-shaped protrusion 132 on a first end of the tooth 130, a V-shaped protrusion 136 on a second end of the tooth 130 opposite the first end, and a V-shaped protrusion 134 on a top end of the tooth 130 opposite the second section floor 120. A V-shaped protrusion 134 on a top end of the tooth 130 assists in the shearing and/or grinding by allowing the second section 106 to be placed into the first section 104 without the need to smash it in place. The V-shaped protrusion 134 may comprise an angle of between approximately 30 degrees and 150 degrees. This helps slice down through the unground material rather than just smashing the sections together with brute force. The V-shaped protrusion 134 on a top end of the tooth 130 also reduces the amount of ground material sticking to the interior of the first cavity 162 and the second cavity 122 by reducing surface area contact.

In the non-limiting embodiment depicted in FIGS. 18F and 18G, each tooth 130 comprises a V-shaped protrusion 132 on a first end of the tooth 130, a V-shaped protrusion 136 on a second end of the tooth 130 opposite the first end, and a V-shaped protrusion 134 on a top end of the tooth 130 opposite the second section floor 120. According to some aspects, each tooth 130 in each concentric teeth ring 140 comprises substantially equal dimensions, while in other embodiments, teeth 130 increase in size as the concentric teeth ring 140 is further from the center. Each tooth of the plurality of teeth 130 may comprise a length of approximately 0.25", approximately 0.33", approximately 0.50", approximately 0.66", approximately 0.75", or approximately 1.00". More particularly, a width of each tooth of the plurality of teeth 130 may be between approximately 0.050" and 0.150". The V-shaped portion of each protrusion may be sharp and angular. In one or more embodiments, each tooth 130 comprises a radiused edged 178 at a base of the tooth 130 where the tooth 30 intersects the second section floor 120, thus providing additional strength to the tooth 130.

According to some aspects, a width of each of the plurality of teeth 130, 150 of the first section 104 and the second section 106 is equal to a distance between adjacent concentric teeth rings 140, 160 of the first section 104 and second section 106. For example, in some embodiments, a width of each tooth of the plurality of teeth 130, 150 may comprise a width of approximately 0.10". In such an embodiment, a gap or distance between the plurality of teeth 150 on a first concentric teeth ring 160 of the first section 104 and the plurality of teeth 130 on an adjacent first concentric teeth ring 140 of the second section 106 is approximately 0.10". Even more particularly, a gap or distance between the magnet boss of each section is also equal to a width of the plurality of teeth 130, 150, and a gap or distance between the outer most centric teeth ring is also equal to a width of the plurality of teeth 130, 150. Such a configuration is advantageous because it results in the exact same consistency when grinding herbs, which is highly desirable. It also ensures an even distribution of ground matter passing in-between the plurality of teeth 130, 150.

In one or more embodiments, rotatable coupling of a first section 104 to a second section 106 is enhanced or strengthened by a magnet 126 at the center of the second cavity 122. The magnet 126 may be magnetically attracted to metal of the first section 104 or, alternatively, a magnet 164 positioned at a center of the first section 104.

In one or more embodiments, each second section 106 comprises a plurality of holes 124 in the second section floor 120. The plurality of holes 124 may be configured to allow ground herbs to be separated and fall through to the third section 108 and/or fourth section 110 typically positioned below the second section 106. According to some aspects, the plurality of holes 214 are arranged in a plurality of concentric hole rings 129 each comprising a plurality of holes 124. In the non-limiting embodiment depicted in FIGS. 18D & 18E, the second section 106 comprises four concentric hole rings 129 each comprising a plurality of holes 124. More particularly, the plurality of concentric teeth rings 140 may be alternately positioned between the plurality of concentric hole rings 129. For example, the non-limiting embodiment depicted in FIGS. 18D & 18E comprises the following concentric rings, working outward from the center magnet 126 of the second section floor: a first concentric hole ring between the center magnet 126 and a first concentric teeth ring, the first concentric teeth ring between the first concentric hole ring and the second concentric hole ring, the second concentric hole ring between the first concentric teeth ring and a second concentric teeth ring, the second concentric teeth ring between the second concentric hole ring and a third concentric hole ring, and the third concentric teeth ring between the second concentric teeth ring and the annular flange 128. Other embodiments may additional or few alternating concentric teeth and hole rings.

Figure 12:
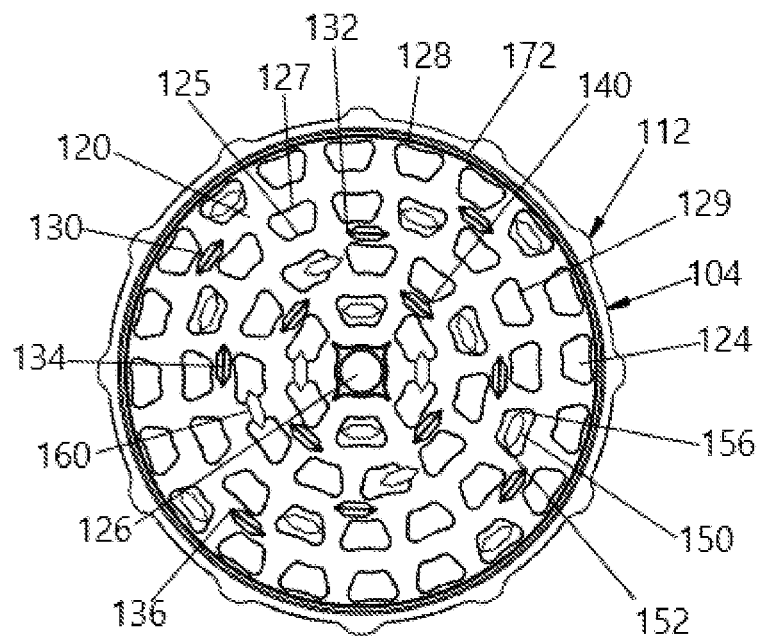
FIG. 12 is a top view of a second embodiment of an herb grinding device with a top wall of a first section removed to provide an interior view of the grinding chamber of the herb grinding device.

In one or more embodiments, the plurality of concentric hole rings 129 of the second section 106 is positioned to align with the plurality of concentric teeth rings 160 of the first section 104. More particularly, the teeth 150 of the first section 104 may be perfectly positioned on a centerline of a hole 124 of a concentric hole ring 129. This allows for the ground material to pass through the holes in a more efficient manner and allows for creation of a pinch point during grinding. FIG. 12 depicts a non-limiting embodiment of an herb grinding device 102 with a top surface 158 removed to view the grinding chamber 185 of the herb grinding device 102. By way of example and not limitation, FIG. 12 depicts each of the four concentric teeth rings 160 of the first section 104 aligning with a different one of the plurality of concentric hole rings 129 of the second section 106. According to some aspects, a distance between each concentric teeth ring 140 of the second section 106 and an adjacent concentric teeth ring 160 of the first section 104 is between approximately 0.050" and 0.150" inches when the first section 104 and the second section 106 are rotatably coupled together. It is noted that the aligned and planar teeth 130, 150 reduce the shearing and/or grinding friction of conventional systems by allowing smooth lid rotation while slicing the material. Conventional grinding teeth mash and tear, while the planar teeth 30, 50 contemplated herein shear and slice, resulting in reduced friction. Such a configuration also helps maintain the integrity of tricombs found on herbal material, which results in a more desirable grinding and/or shearing methodology as it properly prepares the herbs for use without destroying them.

Embodiments of a second section 106 may comprise a plurality of holes 124 of any of a number of shapes and configurations. According to some aspects, each of the plurality of holes 124 may be substantially isosceles trapezoidal in shape with rounded corners. As used herein, substantially isosceles trapezoidal in shape means that each hole 124 may comprise straight sides and angled corners or, alternatively, the each hole 124 may comprise a generally isosceles trapezoid shape with rounded corners and/or rounded or curved sides. Each of the plurality of holes 124 may be positioned such that a longest side 127 of the hole is distal the center of the second cylindrical section floor 120 relative to other sides of the hole. More particularly, a shortest side 125 of the hole is proximate a center of the second cylindrical section floor 120 and a longest side 127 of the hole is distal the center of the second cylindrical section floor 120. In other embodiments, the plurality of holes may be substantially triangular in shape, with a point of the triangle distal the center and leg of the triangle proximate the center of the second cylindrical section floor 120. In still other embodiments, the plurality of holes may comprise a shape similar to holes described elsewhere in this document. These shaped holes are advantageous to conventional holes in conventional grinders. Conventional grinders utilize round holes or slots, which do not help the shearing and grinding efficiency because a pinch point is non-existent on a curved or rounded hole.

Figure 14A:
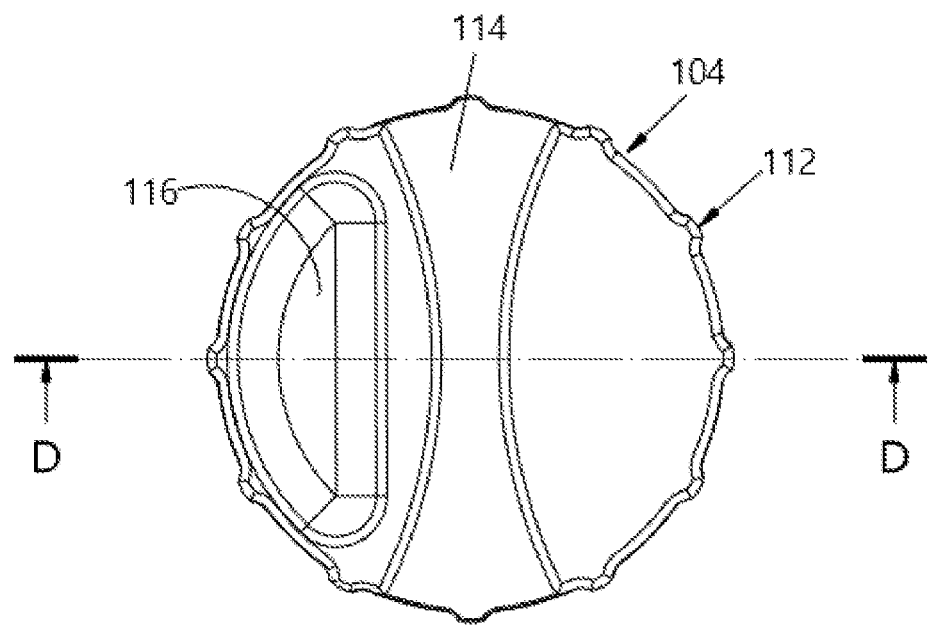
FIG. 14A is a top view of a second embodiment of an herb grinding device.
Figure 14B:
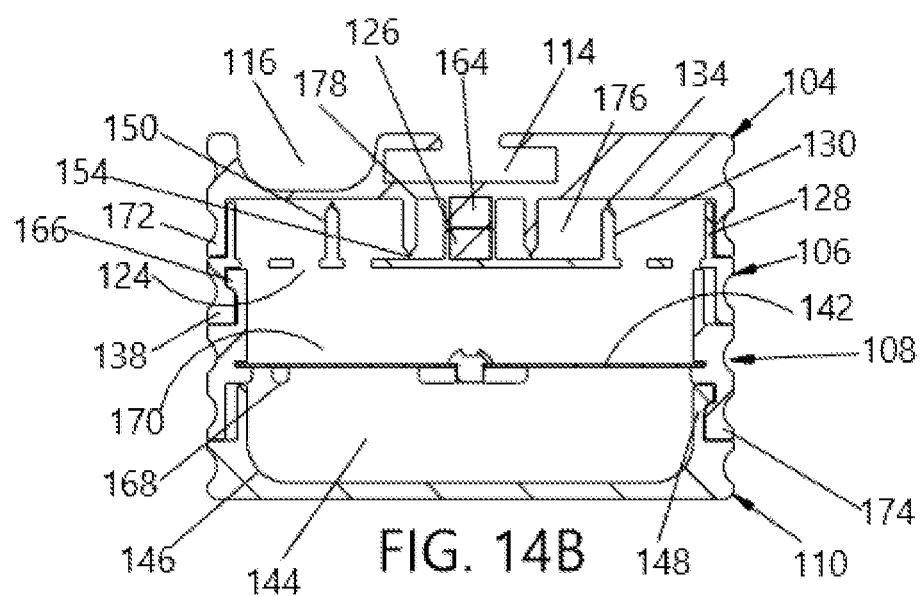
FIG. 14B is a cross-sectional view of a second embodiment of an herb grinding device taken along sectional line D-D in FIG. 14A.
Figure 16A:
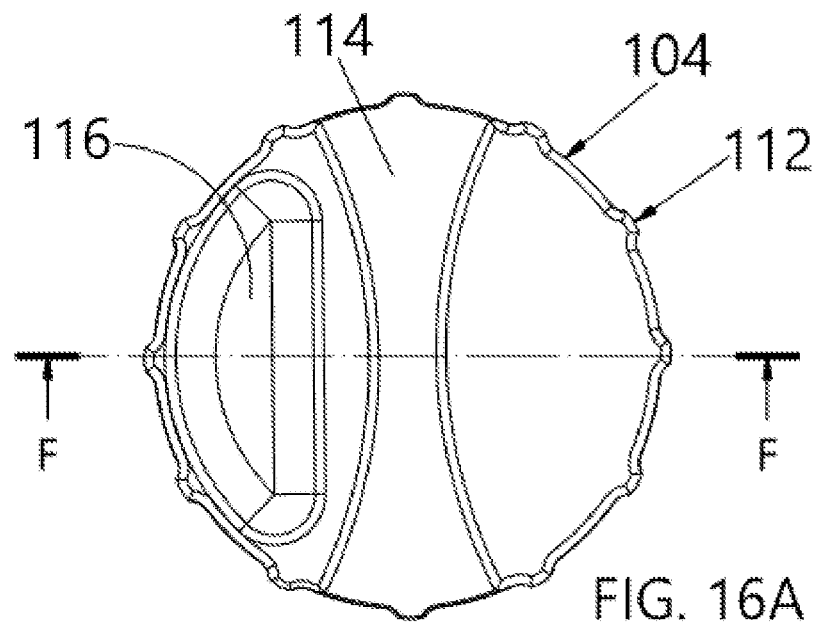
FIG. 16A is a top view of an exploded first and section of a second embodiment of an herb grinding device.
Figure 16B:
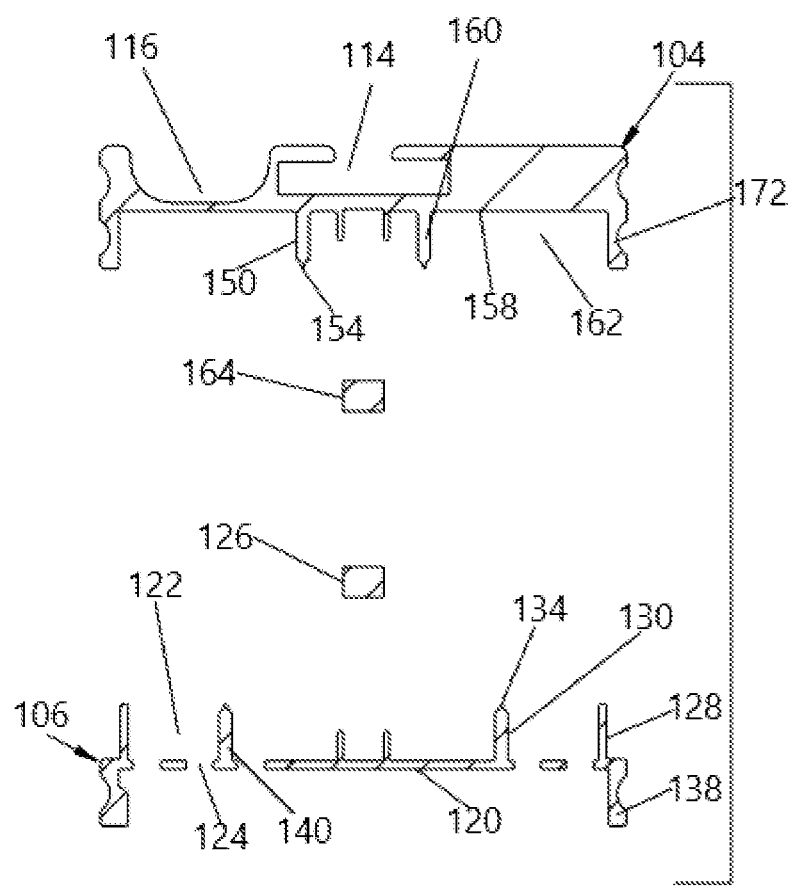
FIG. 16B is a cross sectional view of an exploded first and second section of a second embodiment of an herb grinding device taken along sectional line F-F of FIG. 16A.

FIGS. 14B and 15C depict cross sectional views that include a grinding chamber 185 formed by the alignment of a first cavity 162 of a first section 102 and a second cavity 122 of a second section 106. In one or more embodiments, the first cavity 162 and the second cavity 122 are sized such that a small gap 182 exists between the bottom of the plurality of teeth 150 of the first section 104 and the second section floor 102, and a small gap 180 exists between the top of the plurality of teeth 130 of the second section 106. According to some aspects, each gap 180, 182 is approximately 0.010". Such a configuration allows for a shearing and grinding of herbs within a grinding chamber 185 as a first section 104 is rotated relative to a second section 106. The gaps 180, 182 also reduces the build up and accumulation of residue, which eventually clogs the grinding chamber 185. Furthermore, the gaps 180, 182 may also ensure the magnets 126, 164 holding the first section 104 and the second section 106 together remain coupled, thus ensuring a strong magnetic coupling or seal. The teeth of conventional grinders drag directly on the interior cavity floors, which result in the employment of a thick plastic lid ring to elevate the teeth from the floor. This, in turn, does not allow for a magnetic coupling and results in a weaker seal or coupling of the section. Thus, configurations contemplated herein eliminate the need for a thick plastic lid ring typically employed on all other grinders.

In one or more embodiments, a second section 106 is removably coupled to a third section 108. Even more particularly, a second section 106 may be coupled to a third section 108 with a plurality of lock notches 166. A male lock notch may comprise an angled tab protruding from annular flange, while a female lock notch may comprise an angled recess complementary to the male lock notch and on an inner surface of the section. For example, the non-limiting embodiment depicted in FIGS. 18B and 18E comprises four female lock notches 166 configured to engage with male lock notches 138 of the third section 108. The female lock notches 166 of the second section 106 may be positioned on an inner surface of the second section 106 below the second section floor 120 and opposite the second cavity 122, while the male lock notches 138 of the third section 108 may be positioned on at outer surface of an annular flange of the third section 108 that fits within the second section 106. In other embodiments, the lock notches 166 of the second section 106 may be positioned on an outer surface that fits within a portion of the third section 108. Removably coupling via the four lock notches 166, 138 allows for separation or coupling of the second section 106 and the third section 108 quicker than a conventional thread that has to be unscrewed and rotated multiple times before being completely coupled or uncoupled. Sections may be coupled or uncoupled with a simple one-quarter turn of one of the sections.

Figure 19A:
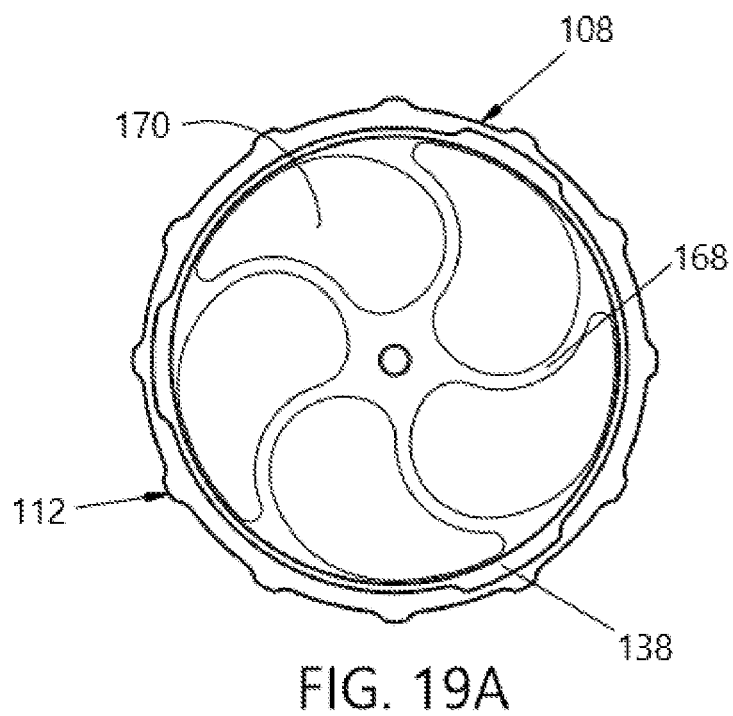
FIG. 19A is a top view of a third section of a second embodiment of an herb grinding device.
Figure 19B:
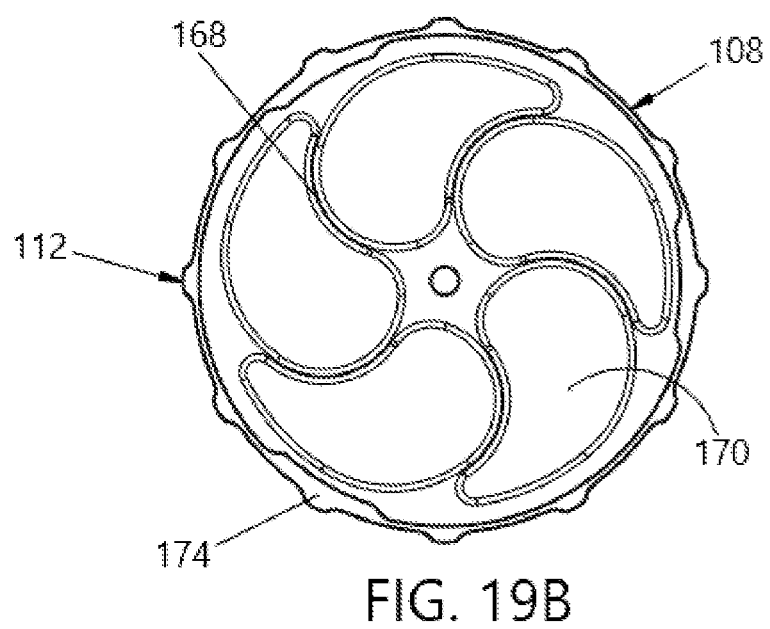
FIG. 19B is a bottom view of a third section of a second embodiment of an herb grinding device.
Figure 19C:
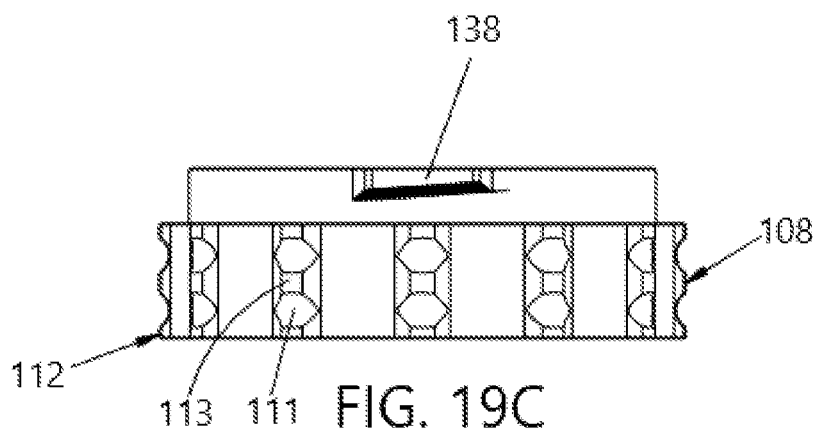
FIG. 19C is a side view of a third section of a second embodiment of an herb grinding device.
Figure 19D:
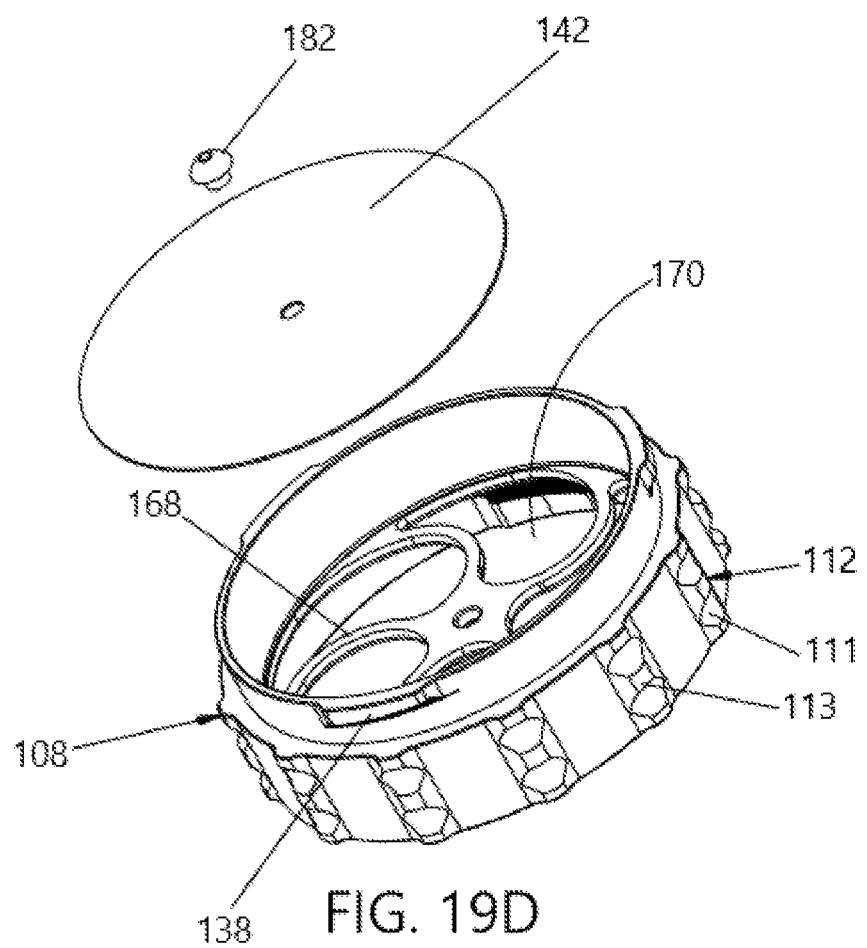
FIG. 19D is an exploded view of a third section of a second embodiment of an herb grinding device.
Figure 19E:
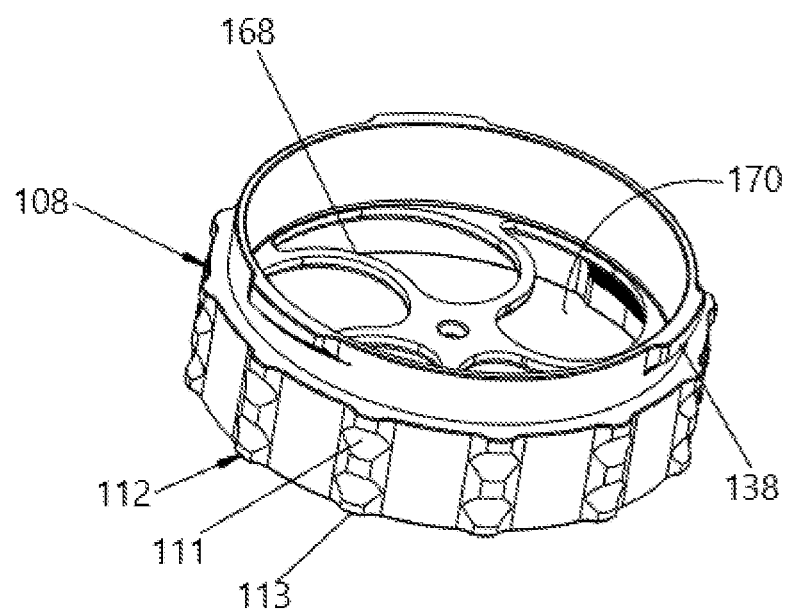
FIG. 19E is a perspective view of a third section of a second embodiment of an herb grinding device without a screen.
Figure 20A:
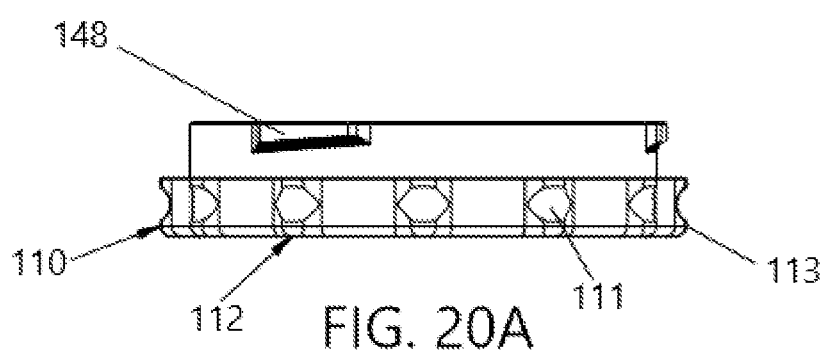
FIG. 20A is a side view of a fourth section of a second embodiment of an herb grinding device.
Figure 20B:
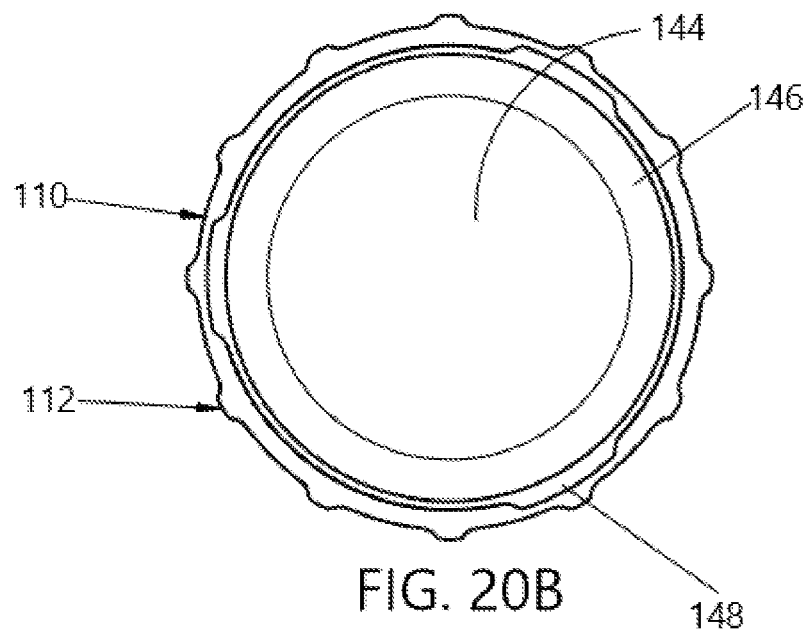
FIG. 20B is a top view of a fourth section of a second embodiment of an herb grinding device.
Figure 20C:
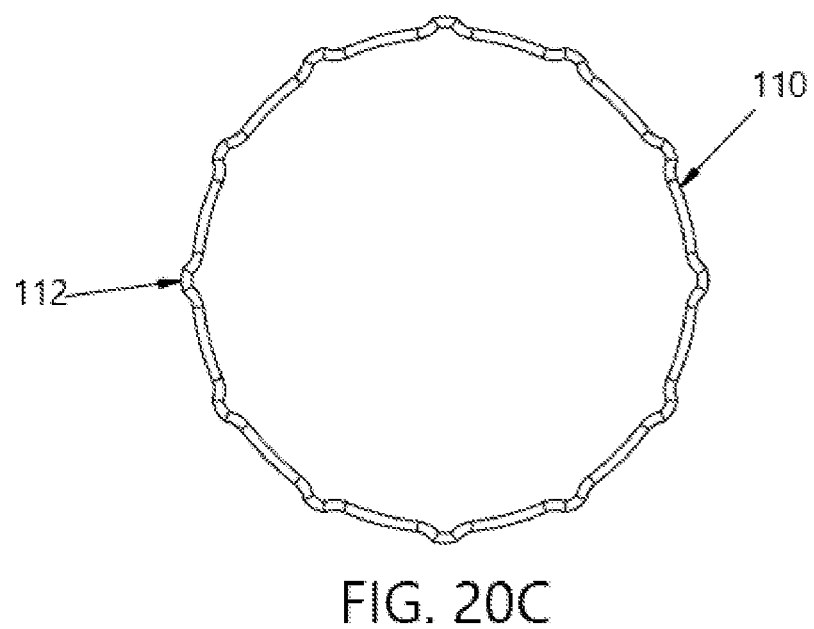
FIG. 20C is a bottom view of a fourth section of a second embodiment of an herb grinding device.
Figure 20D:
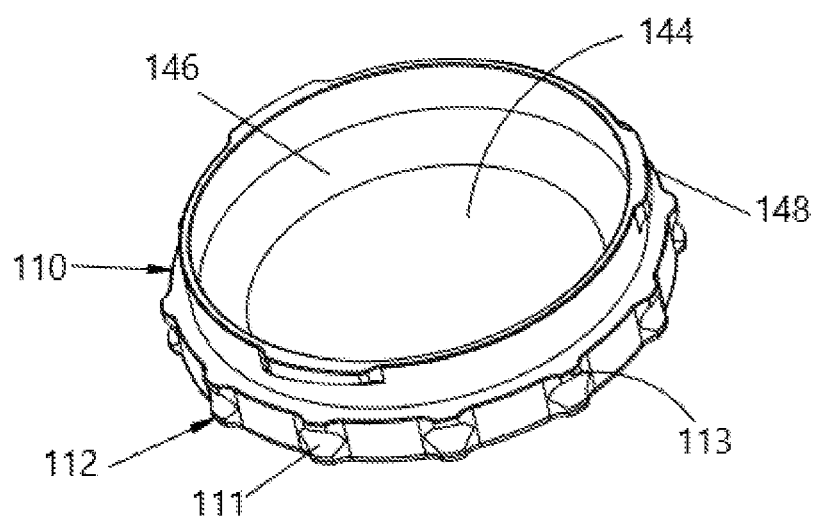
FIG. 20D is a top perspective view of a fourth section of a second embodiment of an herb grinding device.
Figure 20E:
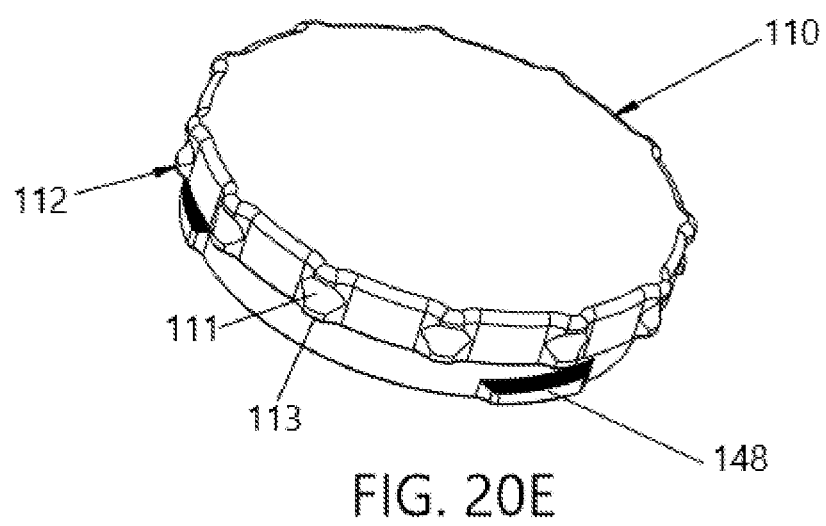
FIG. 20E is a bottom perspective view of a fourth section of a second embodiment of an herb grinding device.

FIGS. 19A-19E depict various view of a non-limiting embodiment of a third section 108 of an herb grinding device 102. A third section 108 may be configured to filter finely ground herbs. According to some aspects, a third section 108 comprises a channel 170 extending through a cylindrical third section 108 and on or more support arms 168 extending across the channel 170. In some embodiments, the one or more support arms 168 comprise a support arms 68 spiraling out from the center of the channel 170. Support arms 168 may be configured to support a bottom surface of a screen 142 coupled to the support arms 168 with a screw 182 such that the screen 142 is positioned within the channel 170. FIG. 19D provides an exploded perspective view of a third section 108 comprises a screen 142, and FIG. 13A provides a perspective view of a third section 108 with a screen 142 coupled to the cross brace support arms 68 in the third section 108. The screen may comprise one of a fine, medium, or coarse woven mesh, stainless steel, or titanium. An outer edge of a screen 142 may be held in place within the third section 108 with a small groove on an inner surface of the channel 170 just above the cross brace support arms 168. Utilizing one or more support arms 168, such as support arms 168 is advantageous to conventional devices because the support arms 168 support the screen 142, rather than unsupported screens stretched across the device like a drum in conventional systems. Such conventional mounting of a screen results in tearing and stretching of the screen over time. In contrast, support of the screen 142 with support arms 168 prevents stretch and tearing, and allows for easy replacement of the screen 142.

As previously noted, a third section 108 may comprise lock notches 138 on an annular flange of the third section 108 for coupling of the third section 108 to a second section 6. According to some aspects, a third section 108 is removably coupled to a fourth section 110. Even more particularly, a third section 108 may be coupled to a fourth section 110 with a plurality of lock notches 174. For example, the non-limiting embodiment depicted in FIG. 19B comprises four lock notches 174 configured to engage with lock notches 148 of the fourth section 10. The lock notches 174 of the third section 108 may be positioned on an inner surface of the third section 108 below the support arms 168, while the lock notches 148 of the fourth section 110 may be positioned on at outer surface of an annular flange of the fourth section 110 that fits within the third section 108. In other embodiments, the lock notches 174 of the third section 108 may be positioned on an outer surface that fits within a portion of the fourth section 110. Removably coupling via the four lock notches 174, 148 allows for separation or coupling of the third section 108 and the fourth section 110 quicker than a conventional thread that has to be unscrewed and rotated multiple times before being completely coupled or uncoupled. Sections may be coupled or uncoupled with a simple one-quarter turn of one of the sections.

FIGS. 20A-E depict various views of a non-limiting embodiment of a fourth section 110 of an herb grinding device 102. A fourth section 110 may be configured to store finely ground particles and/or pollen. As previously noted, a fourth section 110 is configured to be removably coupled to a third section 108. The fourth section 110 may couple to the third section 108 with lock notches 148. In one or more embodiments, a fourth section 110 comprises a collection cavity 144. The collection cavity 144 is configured to collect the grindings of herbs ground in the grinding chamber 185 of the first section 104 and the second section 106. According to some aspects, the collection cavity 144 comprises a radiused edge 146. The radiused edge 146 of the collection cavity 144 allow for easy removal of finely filtered particles and solves the traditional problem of particles getting trapped in the corners of a collection cavity. This configuration allows for a standard guitar pick to contour the radiused edge 146 of the collection cavity 144 to assist in fine pollen removal. It is also configured for use of a finger to remove or scoop the particles from the collection cavity 144. It is further contemplated that the fourth section 110 comprising a collection cavity 144 may be removably coupled to the second section 106 comprising a second section floor as previously described. That is, in some embodiments, a third section 1088 is not necessary. Coupling of the fourth section 110 to the second section 106 may be similar to the coupling of a third section 108 to a second section 106.

Figure 21A:
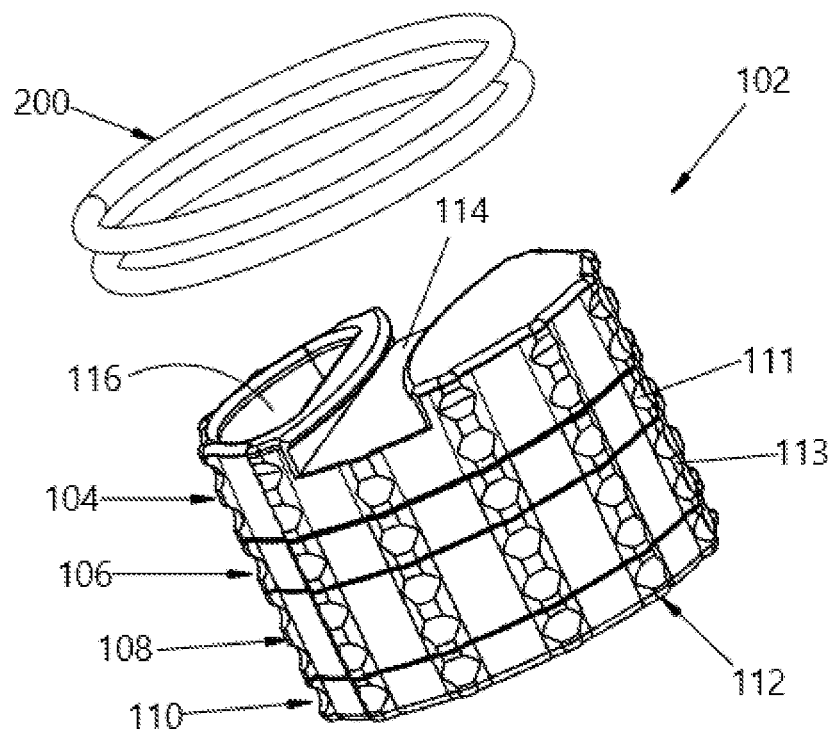
FIG. 21A is a perspective view of a second embodiment of an herb grinding device with bumper rings separated from the herb grinding device.
Figure 21B:
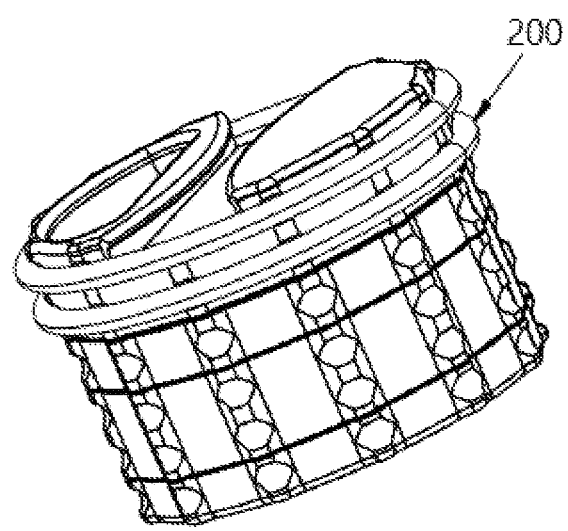
FIG. 21B is a perspective view of a second embodiment of an herb grinding device with bumper rings coupled to the first section of the herb grinding device.
Figure 21C:
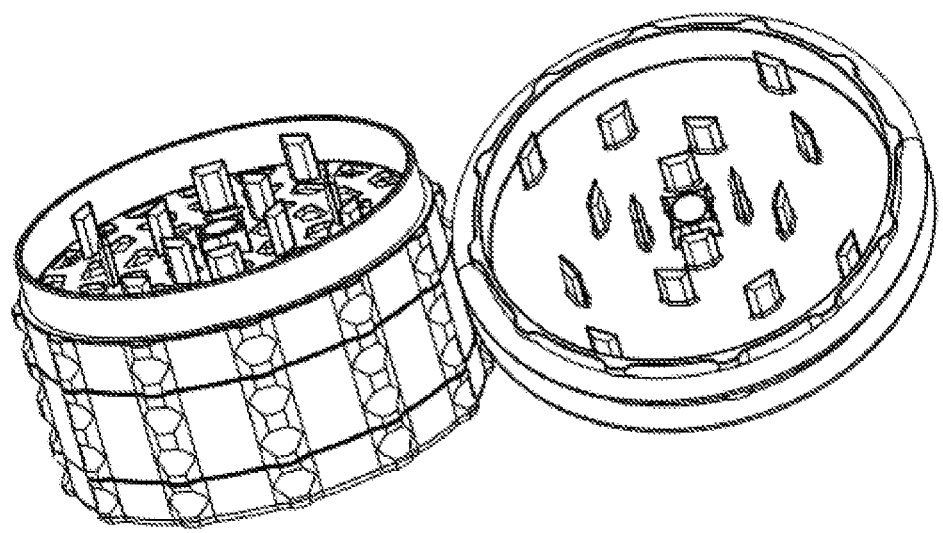
FIG. 21C is a perspective view of a second embodiment of an herb grinding device with bumper rings coupled to the first section of the herb grinding device, the first section being removed from the other sections of the herb grinding device.

Also contemplated in this disclosure is an herb grinding device 102 comprising one or more bumper rings 200. FIG. 21A shows a non-limiting embodiment of an herb grinding device 102 having two bumper rings 200 separated from the body of the herb grinding device 102, and FIGS. 21B and 21C shows a non-limiting embodiment of an herb grinding device 102 with two bumper rings 200 removably coupled to the first section 104 of the herb grinding device 102. According to some aspects, the bumper rings 200 comprise rubber and/or elastic O-rings sized wrap around any of the four section of the herb grinding device 102 and fit within the recesses 111 of the grips 112 extending axially along an outer circumference of the respective section or sections. When removably coupled to the first section 102, the bumper rings 200 enable a user to remove the first section 104 and tap it against the other sections of the herb grinding device 102 or other surfaces, allowing stubborn product to fall through the holes 124 and the pollen screen 142 without damaging the exterior of the herb grinding device 102. While FIGS. 21B-21C show the bumper rings 200 removably coupled to the first section 104, it is contemplated that the bumper rings 200 are size to stretch around and removably couple to any of the first section 104*d*, the second section 106, the third section 108, and/or the fourth section 110.

It will be understood that implementations are not limited to the specific components disclosed herein, as virtually any components consistent with the intended operation of a method and/or system implementation for herb grinding devices may be utilized. Accordingly, for example, although particular herb grinding devices may be disclosed, such components may comprise any shape, size, style, type, model, version, class, grade, measurement, concentration, material, weight, quantity, and/or the like consistent with the intended operation of a method and/or system implementation for an herb grinding device may be used.

In places where the description above refers to particular implementations of an herb grinding device, it should be readily apparent that a number of modifications may be made without departing from the spirit thereof and that these implementations may be applied to other herb grinding devices. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An herb grinding device, comprising:
   a first cylindrical section comprising a first cavity, a top surface, and a plurality of teeth extending from the top surface within the first cavity in at least two concentric teeth rings, each of the plurality of teeth comprising a V-shaped protrusion on a bottom end opposite the top surface and each of the at least two concentric teeth rings comprising at least two teeth;
   a second cylindrical section rotatably coupled to the first cylindrical section and comprising a second cavity facing the first cavity, a second cylindrical section floor, a plurality of holes in the second cylindrical section floor, and a plurality of teeth extending from the second cylindrical section floor within the second cavity in at least two concentric teeth rings each comprising at least two teeth, each of the plurality of teeth comprising a V-shaped protrusion on a top end of the circular arced tooth opposite the second cylindrical section floor, wherein the at least two concentric teeth rings of the second cylindrical section are positioned between the at least two concentric teeth rings of the first cylindrical section and the plurality of teeth of the second cylindrical section at least partially overlap the plurality of teeth of the first cylindrical section; and
   at least a third cylindrical section removably coupled to the second cylindrical section, the at least third cylindrical section comprising a collection cavity.

2. The herb grinding device of claim 1, wherein the second cylindrical section comprises an annular flange positioned within the first cavity and interfacing an outer wall of the first cylindrical section, and wherein the at least third cylindrical section comprises:
   a third cylindrical section removably coupled to the second cylindrical section opposite the first cylindrical section, the third cylindrical section comprising a channel extending through the third cylindrical section and one or more support arms extending across the channel; and
   a fourth cylindrical section removably coupled to the third cylindrical section opposite the second cylindrical section, the fourth cylindrical section comprising the collection cavity.

3. The herb grinding device of claim 2, wherein the plurality of holes in the second cylindrical section floor are arranged in at least two concentric hole rings each comprising a plurality of holes, each of the at least two concentric hole rings being aligned with each of the at least two concentric teeth rings of the first cylindrical section.

4. The herb grinding device of claim 3, further comprising a gap of approximately 0.010" inches between the bottom end of each of the plurality of teeth of the first cylindrical section and the second cylindrical section floor and a gap of approximately 0.010" inches between the top end of each of the plurality of teeth of the second cylindrical section and the top surface.

5. The herb grinding device of claim 3, wherein:
the plurality of holes are substantially isosceles trapezoidal in shape with rounded corners, each of the plurality of holes being positioned such that a shortest side of the hole is proximate a center of the second cylindrical section floor and a longest side of the hole is distal the center of the second cylindrical section floor; and
each of the plurality of teeth of the first cylindrical section and the second cylindrical section are substantially planar, equal in dimension and comprise a V-shaped protrusion on a first end of the tooth and a V-shaped protrusion on a second end of the tooth.

6. The herb grinding device of claim 5, wherein the first section comprises at least three concentric teeth rings each comprising at least four teeth of the plurality of teeth of the first section offset from at least four teeth of an adjacent concentric teeth ring of the plurality of concentric teeth rings of the first section, and wherein the second cylindrical section comprises at least three concentric teeth rings each comprising at least four teeth of the plurality of teeth of the second cylindrical section offset from a plurality of teeth of an adjacent concentric teeth ring of the plurality of concentric teeth rings of the second cylindrical section.

7. The herb grinding device of claim 3, wherein the first cylindrical section is coupled to the second cylindrical section with a first magnet positioned at a center of the top surface and a second magnet positioned at a center of the second cylindrical section floor and in contact with the first magnet at a center point between the top surface and the second cylindrical section floor, and the herb grinding device further comprises a radiused edge within the collection cavity and a screen coupled to the one or more support arms and positioned within the channel.

8. The herb grinding device of claim 3, wherein the first cylindrical section comprises a recessed outer cavity, a T-shaped slot, and one or more bumper rings removably coupled the first section, the fourth cylindrical section comprises a male lock notch positioned on an annular flange, the third cylindrical section comprises a female lock notch positioned within the third cylindrical section and configured to engage the male lock notch of the fourth cylindrical section, the third cylindrical section comprises a male lock notch positioned on an annular flange, the second cylindrical section comprises a female lock notch positioned within the second cylindrical section and configured to engaged the male lock notch of the third cylindrical section, and each of the first, second, third, and fourth cylindrical sections each comprise a plurality of grips, each grip of the plurality of grips comprising alternating grip protrusions and grip recesses positioned axially along an outer perimeter of the respective section, wherein the plurality of grips of the second, third, and fourth cylindrical sections align with one another when the male lock notch of the third cylindrical section is engaged with the female lock notch of the second cylindrical section and the male lock notch of the fourth cylindrical section is engaged with the female lock notch of the third cylindrical section, and the one or more bumper rings are positioned within the grip recesses of the plurality of grips of the first cylindrical section.

9. An herb grinding device comprising:
a first cylindrical section comprising a first cavity, a top surface, a plurality of teeth extending from the top surface within the first cavity;
a second cylindrical section rotatably and removably coupled to the first cylindrical section and comprising a second cavity facing the first cavity, a second cylindrical section floor, a plurality of holes in the second cylindrical section floor, a plurality of teeth extending from the second cylindrical section floor within the second cavity, and an annular flange positioned within the first cavity and interfacing an outer wall of the first cylindrical section;
a third cylindrical section removably coupled to the second cylindrical section opposite the first cylindrical section, the third cylindrical section comprising a channel extending through the third cylindrical section and one or more support arms extending across the channel; and
a fourth cylindrical section removably coupled to the third cylindrical section opposite the second cylindrical section, the fourth cylindrical section comprising a collection cavity, wherein each of the first, second, third, and fourth cylindrical sections each comprise a plurality of grips, each grip of the plurality of grips comprising alternating grip protrusions and grip recesses positioned axially along an outer perimeter of the respective section, wherein the plurality of grips of the second, third, and fourth cylindrical sections align with one another when the third cylindrical section is coupled to the second cylindrical section and the fourth cylindrical section is coupled to the third cylindrical section.

10. The herb grinding device of claim 9, further comprising a T-shaped slot on an outside surface of the first cylindrical section and one or more bumper rings removably coupled to the first cylindrical section, the one or more bumper rings being positioned within the grip recesses of the plurality of grips of the first cylindrical section.

11. The herb grinding device of claim 9, wherein the plurality of teeth of the first cylindrical section are positioned in at least two concentric teeth rings, each of the plurality of teeth of the first cylindrical section comprising a V-shaped protrusion on a bottom end opposite the top surface and each of the at least two concentric teeth rings comprising at least two teeth, and wherein the plurality of teeth of the second cylindrical section are positioned in at least two concentric teeth rings, each of the plurality of teeth of the second cylindrical section comprising a V-shaped protrusion on a bottom end opposite the top surface and each of the at least two concentric teeth rings comprising at least two teeth.

12. The herb grinding device of claim 11, wherein the plurality of holes in the second cylindrical section floor are arranged in at least two concentric hole rings each comprising a plurality of holes, each of the at least two concentric hole rings being aligned with each of the at least two concentric teeth rings of the first cylindrical section.

13. The herb grinding device of claim 12, further comprising a gap of approximately 0.010" inches between the bottom end of each of the plurality of teeth of the first cylindrical section and the second cylindrical section floor and a gap of approximately 0.010" inches between the top end of each of the plurality of teeth of the second cylindrical section and the top surface.

14. The herb grinding device of claim 12, wherein:
the plurality of holes are substantially isosceles trapezoidal in shape with rounded corners, each of the plurality of holes being positioned such that a shortest side of the hole is proximate a center of the second cylindrical section floor and a longest side of the hole is distal the center of the second cylindrical section floor; and each of the plurality of teeth of the first cylindrical section and the second cylindrical section are substantially planar, equal in dimension and comprise a V-shaped protrusion on a first end of the tooth and a V-shaped protrusion on a second end of the tooth.

15. The herb grinding device of claim 14, wherein the first cylindrical section comprises at least three concentric teeth rings each comprising at least four teeth of the plurality of teeth of the first cylindrical section offset from at least four teeth of an adjacent concentric teeth ring of the plurality of concentric teeth rings of the first cylindrical section, and wherein the second cylindrical section comprises at least three concentric teeth rings each comprising at least four teeth of the plurality of teeth of the second cylindrical section offset from a plurality of teeth of an adjacent concentric teeth ring of the plurality of concentric teeth rings of the second cylindrical section.

16. The herb grinding device of claim 12, wherein the first cylindrical section is coupled to the second cylindrical section with a first magnet positioned at a center of the top surface and a second magnet positioned at a center of the second cylindrical section floor and in contact with the first magnet at a center point between the top surface and the second cylindrical section floor, and the herb grinding device further comprises a radiused edge within the collection cavity and a screen coupled to the one or more support arms and positioned within the channel.

17. An herb grinding device, comprising:
a first cylindrical section comprising a first cavity, a top surface, and a plurality of teeth extending from the top surface within the first cavity, and a T-shaped slot on an outside surface of the first cylindrical section opposite the first cavity, the T-shaped slot sized to receive a rolling papers sleeve package within the T-slot;
a second cylindrical section rotatably coupled to the first cylindrical section and comprising a second cavity facing the first cavity, a second cylindrical section floor, a plurality of holes in the second cylindrical section floor, and a plurality of teeth extending from the second cylindrical section floor within the second cavity; and
at least a third cylindrical section removably coupled to the second cylindrical section, the at least third cylindrical section comprising a collection cavity.

18. The herb grinding device of claim 17, wherein the second cylindrical section comprises an annular flange positioned within the first cavity and interfacing an outer wall of the first cylindrical section, and wherein the at least third cylindrical section comprises:

a third cylindrical section removably coupled to the second cylindrical section opposite the first cylindrical section, the third cylindrical section comprising a channel extending through the third cylindrical section and one or more support arms extending across the channel; and a fourth cylindrical section removably coupled to the third cylindrical section opposite the second cylindrical section, the fourth cylindrical section comprising the collection cavity, wherein each of the first, second, third, and fourth cylindrical sections each comprise a plurality of grips, each grip of the plurality of grips comprising alternating grip protrusions and grip recesses positioned axially along an outer perimeter of the respective section, wherein the plurality of grips of the second, third, and fourth cylindrical sections align with one another when the third cylindrical section is coupled to the second cylindrical section and the fourth cylindrical section is coupled to the third cylindrical section.

19. The herb grinding device of claim 17, wherein:
the plurality of teeth of the first cylindrical section are positioned in at least two concentric teeth rings, each of the plurality of teeth of the first cylindrical section comprising a V-shaped protrusion on a bottom end opposite the top surface and each of the at least two concentric teeth rings comprising at least two teeth;
the plurality of teeth of the second cylindrical section are positioned in at least two concentric teeth rings, each of the plurality of teeth of the second cylindrical section comprising a V-shaped protrusion on a bottom end opposite the top surface and each of the at least two concentric teeth rings comprising at least two teeth; and
the plurality of holes in the second cylindrical section floor are arranged in at least two concentric hole rings each comprising a plurality of holes, each of the at least two concentric hole rings being aligned with each of the at least two concentric teeth rings of the first cylindrical section.

20. The herb grinding device of claim 19, wherein:
the plurality of holes are substantially isosceles trapezoidal in shape with rounded corners, each of the plurality of holes being positioned such that a shortest side of the hole is proximate a center of the second cylindrical section floor and a longest side of the hole is distal the center of the second cylindrical section floor; and
each of the plurality of teeth of the first cylindrical section and the second cylindrical section are substantially planar, equal in dimension and comprise a V-shaped protrusion on a first end of the tooth and a V-shaped protrusion on a second end of the tooth.

* * * * *